(12) United States Patent
Walker et al.

(10) Patent No.: US 7,343,319 B1
(45) Date of Patent: Mar. 11, 2008

(54) MULTI-TIER PRICING OF INDIVIDUAL PRODUCTS BASED ON VOLUME DISCOUNTS

(75) Inventors: Jay S. Walker, Ridgefield, CT (US); Andrew S. Van Luchene, Norwalk, CT (US); Magdalena Mik, Greenwich, CT (US); Daniel E. Tedesco, Canaan, CT (US)

(73) Assignee: Walker Digital, LLC, Stamford, CT (US)

( * ) Notice: Subject to any disclaimer, the term of this patent is extended or adjusted under 35 U.S.C. 154(b) by 1293 days.

(21) Appl. No.: 09/350,875

(22) Filed: Jul. 9, 1999

(51) Int. Cl.
*G06Q 30/00* (2006.01)
(52) U.S. Cl. .......................................... 705/21; 705/26
(58) Field of Classification Search ................ 705/14, 705/16, 17–25, 26, 27, 400, 402, 500
See application file for complete search history.

(56) References Cited

U.S. PATENT DOCUMENTS

| | | |
|---|---|---|
| 4,008,792 A | 2/1977 | Levasseur et al. |
| 4,195,864 A | 4/1980 | Morton et al. |
| 4,498,570 A | 2/1985 | King et al. |
| 4,679,150 A | 7/1987 | Hayashi et al. |
| 4,833,308 A | 5/1989 | Humble |
| 4,982,346 A | 1/1991 | Girouard et al. |
| 5,053,957 A | 10/1991 | Suzuki |
| 5,056,019 A * | 10/1991 | Schultz et al. ................. 705/14 |
| 5,444,630 A * | 8/1995 | Dlugos ........................ 705/402 |
| 5,537,314 A | 7/1996 | Kanter ......................... 364/406 |
| 5,687,322 A | 11/1997 | Deaton et al. |
| 5,822,216 A | 10/1998 | Satchell, Jr. et al. |
| 5,822,736 A | 10/1998 | Hartman et al. |
| 6,332,128 B1 | 12/2001 | Nicholson ..................... 705/14 |

(Continued)

FOREIGN PATENT DOCUMENTS

DE 2315307 3/1973

(Continued)

OTHER PUBLICATIONS

Linda Purpura, "Green Hills Farms Finding Gold in Frequent-Shopper Cards," Supermarket News, Feb. 24, 1997, p. 19.

(Continued)

*Primary Examiner*—Gerald J. O'Connor

(57) ABSTRACT

A point of sale system or other computer system stores a product pricing database in which a full price and discount prices corresponding to one or more discount pricing tiers are stored for each product available for sale. Each of the discount prices for a given product has an associated threshold purchase total that has to be satisfied before the discount price is applied to a transaction. When a transaction occurs, the purchase total for the transaction is first calculated on the basis of full retail prices for the products and the purchase total for the transaction is compared with one or more threshold purchase totals which correspond to the discount pricing tiers. If a discount pricing tier is applicable (e.g. the calculated purchase total for the transaction is at least equal to a threshold purchase total), the appropriate discount prices for each product in the transaction are retrieved and used to calculate a reduced purchase total for the transaction. Qualification for discount pricing can also be based on, for example, a customer's purchasing history, or the number of a certain type of product included in the transaction instead of the purchase total of a transaction.

31 Claims, 35 Drawing Sheets

7000

| CREAM CHEESE | | | |
|---|---|---|---|
| RETAIL PRICE $1.80 | GOLD PRICE $1.50 | SILVER PRICE $1.65 | BRONZE PRICE $1.75 |

7050

| QUALIFY FOR: | BY SPENDING |
|---|---|
| GOLD PRICES | $150.00 |
| SILVER PRICES | $100.00 |
| BRONZE PRICES | $75.00 |

U.S. PATENT DOCUMENTS

2001/0056376 A1   12/2001   Walker et al. ................. 705/15

FOREIGN PATENT DOCUMENTS

| EP | 0 512 509 A2 | 11/1992 |
|---|---|---|
| JP | 05094591 | 4/1993 |
| JP | 07220172 | 8/1995 |
| JP | 07249178 | 9/1995 |
| JP | 08077256 | 3/1996 |
| JP | 08272856 | 10/1996 |
| JP | 09062908 | 3/1997 |
| JP | 09282535 | 10/1997 |
| JP | 10143730 | 5/1998 |
| JP | 10154274 | 6/1998 |
| WO | WO96/32683 | 10/1996 |
| WO | WO98/06050 | 2/1998 |
| WO | WO98/21713 | 5/1998 |
| WO | WO99/19809 | 4/1999 |
| WO | WO99/20013 | 4/1999 |

OTHER PUBLICATIONS

Liz Bowie, "Food Lion looks toward Baltimore", The Baltimore Sun, Apr. 28, 1997, p. 11C.

Rebecca Smith, "Buy More, Pay Less; Frequent Shopper Programs Promise a Brave New World in Grocery Buying", Pittsburgh Post-Gazette, Jan. 19, 1998, p. E1.

PCT International Search Report for Application No. PCT/US00/18638, dated Oct. 20, 2000.

* cited by examiner

|  | PRODUCT IDENTFIER 4001 | PRICE 4002 |
|---|---|---|
| 4010 → | P135 | $2.99 |
| 4020 → | P147 | $2.39 |
| 4030 → | P153 | $1.99 |

PRIOR ART

| PRICING TIER 6005 | THRESHOLD PURCHASE TOTAL 6010 |
|---|---|
| GOLD | $150 |
| SILVER | $100 |
| BRONZE | $75 |

| PRICING TIER 6025 | PURCHASE TOTAL (PT) RANGE 6030 |
|---|---|
| GOLD | $150 ≤ PT |
| SILVER | $100 ≤ PT < $150 |
| BRONZE | $75 ≤ PT < $100 |
| RETAIL | $0 < PT < $75 |

6021 → GOLD row
6022 → SILVER row
6023 → BRONZE row
6024 → RETAIL row

FIG. 6B

| PRICING TIER 6055 | NUMBER OF QUALIFYING PRODUCTS (QP) 6060 |
|---|---|
| GOLD | QP ≥ 10 |
| SILVER | 6 ≤ QP < 10 |
| BRONZE | 3 ≤ QP < 6 |
| RETAIL | 0 < QP < 3 |

| CREAM CHEESE | | | |
|---|---|---|---|
| RETAIL PRICE $1.80 | GOLD PRICE $1.50 | SILVER PRICE $1.65 | BRONZE PRICE $1.75 |

— 7050

QUALIFY FOR:

BY SPENDING

| | |
|---|---|
| GOLD PRICES | $150.00 |
| SILVER PRICES | $100.00 |
| BRONZE PRICES | $75.00 |

FIG. 7

| PRODUCT IDENTIFIER 8010 | PRODUCT DESCRIPTION 8020 | GOLD PRICE 8030 | SILVER PRICE 8040 | BRONZE PRICE 8050 | RETAIL PRICE 8060 |
|---|---|---|---|---|---|
| P101 | CREAM CHEESE 6 OZ. | $1.50 | $1.65 | $1.75 | $1.80 |
| P102 | ORANGE JUICE 1 GAL. | $2.05 | $2.15 | $2.23 | $2.29 |
| P103 | SKIM MILK 1/2 GAL. | $2.50 | $2.65 | $2.75 | $2.83 |
| P104 | RYE BREAD | $2.00 | $2.55 | $3.10 | $3.25 |
| P105 | GRANOLA CEREAL | $2.75 | $2.75 | $2.75 | $2.75 |

FIG. 8

| FIRST PRICE 9004 | CONDITION 1 9012 |
|---|---|
| SECOND PRICE 9006 | CONDITION 2 9014 |
| THIRD PRICE 9008 | CONDITION 3 9016 |

9010

PRODUCT IDENTIFIER 9002

FIG. 9A

| PRODUCT IDENTIFIER | PRICE | PRICE | PRICE | PRICE |
|---|---|---|---|---|
| | PURCHASE TOTAL RANGE | PURCHASE TOTAL RANGE | PURCHASE TOTAL RANGE | PURCHASE TOTAL RANGE |
| P101 _1010_ | $1.80 _1012_ $0 < PT < $75 _1016_ | $1.75 _1014_ PT < $75 _1018_ | | |
| P151 _1020_ | $2.29 _1022_ $0 < PT < $100 _1026_ | $2.23 _1024_ $100 ≤ PT _1028_ | | |
| P135 _1030_ | $2.99 _1032_ $0 < PT < $75 _1038_ | $2.95 _1034_ $75 < PT ≤ $100 _1039_ | $2.90 _1036_ $100 < PT _1040_ | |

FIG. 9C

| PRODUCT IDENTIFIER 1050 | RETAIL PRICE 1052 | PRICE DECREMENT 1054 | MINIMUM PRICE 1056 |
|---|---|---|---|
| P135 | $2.99 | $0.05 | $2.69 |

| PURCHASE TOTAL THRESHOLD 1062 | PURCHASE TOTAL INCREMENT 1064 |
|---|---|
| $50 | $10 |

| P135 1070 | $2.99 1071 | $2.94 1072 | $2.89 1073 | $2.84 1074 | $2.79 1075 | $2.74 1076 | $2.69 1077 |

| $0 < PT ≤ $50 1081 | $50 < PT ≤ $60 1082 | $60 < PT ≤ $70 1083 | $70 < PT ≤ $80 1084 | $80 < PT ≤ $90 1085 | $90 < PT ≤ $100 1086 | $110 < PT 1087 |

| | | |
|---|---|---|
| TRANSACTION IDENTIFIER | T12345 | 402 |
| CUSTOMER IDENTIFIER | C111 | 404 |
| OPERATOR IDENTIFIER | XXX | 406 |
| POS IDENTIFIER | P92 | 408 |
| PURCHASE TOTAL | $118.92 | 410 |
| DATE 1/12/99 | TIME 3:32 PM | 412 |

| PRODUCT IDENTIFIER 414 | PRODUCT PRICE PAID 416 |
|---|---|
| P101 | $1.65 |
| P108 | $2.10 |
| P113 | $0.99 |

| CUSTOMER IDENTIFIER 502 | CUSTOMER NAME 504 | PRICING TIER 506 |
|---|---|---|
| C111 | JOE SMITH | GOLD |
| C112 | JANE DOE | BRONZE |
| C113 | BOB BROWN | SILVER |
| C114 | SUZY JOHNSON | RETAIL |

FIG. 16A

| TEAM IDENTIFIER 522 | TEAM PRICING TIER 524 |
|---|---|
| 1932 | SILVER |
| 2104 | GOLD |
| 1318 | BRONZE |

FIG. 17A

| CUSTOMER IDENTIFIER 502 | CUSTOMER NAME 504 | TEAM IDENTIFIER 510 |
|---|---|---|
| C111 | JOE SMITH | 1932 |
| C112 | JANE DOE | 2104 |
| C113 | BOB BROWN | N/A |

FIG. 17B

MULTI-TIER PRICING OF INDIVIDUAL PRODUCTS BASED ON VOLUME DISCOUNTS

CROSS-REFERENCE TO RELATED APPLICATIONS

The following co-pending, commonly-owned, U.S. patent applications are related to the present application: U.S. patent application Ser. No. 09/166,267, entitled "METHOD AND APPARATUS FOR DETERMINING A PROGRESSIVE DISCOUNT FOR A CUSTOMER BASED ON THE FREQUENCY OF THE CUSTOMER'S TRANSACTIONS", filed on Oct. 5, 1998; and U.S. patent application Ser. No. 09/118,414, entitled "POINT-OF-SALE SYSTEM AND METHOD FOR THE MANAGEMENT OF GROUP REWARDS", filed on Jul. 17, 1998.

FIELD OF THE INVENTION

The method and apparatus of the present invention relate to calculating discounted prices for products sold at retail.

BACKGROUND

It is a common practice for retail sellers to discount the prices of products in order to attract customers and increase sales volume. One very widespread method of discounting involves issuance of coupons. One type of coupon may be presented by the buyer when a particular product is purchased, in order to obtain a reduced price for the product. Another type of coupon may be presented to obtain X dollars off or X percent off a total purchase of Y dollars.

It is also common to extend discounts of the latter kind without issuing or requiring presentation of a coupon. For example, retailers frequently advertise special sales of X percent off all purchases made on a given day or all purchases made on that day of over a given amount.

Another well-known promotional approach invites the customer to "buy one, and get one free". Alternatively and as an inducement to purchase larger quantities of products, discount prices are offered for the purchase of increased quantities of products (commonly referred to as "bulk discounts"), as in "one for 50¢, three for $1".

Other discount plans are available only to customers who are "members" of the plan. These include membership club "superstores" that offer discounted prices on all products sold but are not open to the general public. Other stores (particularly supermarkets) are open to all but issue preferred customer cards that entitle the holder to discounts on some or all products in the store.

Most, if not all, of these discounting approaches have some disadvantages. For example, coupons or other promotions which apply only to a certain product or products will do little to attract customers who are not interested in purchasing those products. On the other hand, across-the-board discount offers may be disadvantageous to the retailer, since some customers may concentrate their purchases on products which carry a low profit margin. When this occurs, the retailer may find that additional revenues generated by the promotion do not translate into much, if any, additional profit. One way in which retailers have attempted to deal with this problem is by excluding low-margin products from sales of the "take 10% off everything" type.

In a somewhat similar known approach, it is known in the supermarket environment to grant a discount of 10% off a group of products if the total purchase amount spent by a customer on a visit to the store is at least $20. If the total purchase amount is at least $50, then a 20% discount is applied to products purchased from the qualified group of products.

None of the known discounting and promotional techniques has fully addressed the need to balance the attractive features of discounting with preservation of profit margins on the products to be sold.

SUMMARY OF THE INVENTION

In a preferred embodiment, the present invention provides a method and apparatus for calculating a purchase total for a transaction, in which: (a) a number of product identifiers are received, each representing a respective product to be purchased, (b) an initial purchase total for the transaction is calculated on the basis of a respective first price for each of the products to be purchased, (c) it is determined whether the initial purchase total is at least equal to a predetermined threshold purchase total, and (d) if such is the case, a reduced purchase total is calculated for the transaction on the basis of respective second prices for each of the products to be purchased, where at least some of the second prices are lower than the corresponding first prices. The first and second prices (and perhaps third and fourth or even more prices) are, in one embodiment, stored in a database and are retrieved as necessary to calculate the initial purchase total and a discounted purchase total for which the transaction is qualified.

It is contemplated to apply the present invention in a variety of different types of retail stores, including supermarkets, drugstores and quick service restaurants. In such applications, a conventional point of sale system is programmed to carry out the invention. A suitable pricing database, including multiple prices for at least some of the products available for sale, is stored in the point of sale system.

It is also contemplated to apply the present invention to other retailing outlets including catalog-ordering facilities, and shopping Web sites maintained on the Internet.

The customer may be permitted to qualify for discounted prices on the products available for sale on the basis of a number of criteria, including a purchase total of a current purchase transaction, the sum of purchase totals over a predetermined period of time, membership in a group that has maintained or reached a predetermined sum of purchase totals or other level of purchases, purchasing of a predetermined combination of products, or purchasing a predetermined number of qualifying products, such as a number of products which carry the same brand.

The discounting methods and apparatus of the present invention permit the seller to predetermine and store one or more levels of discount prices on a product-by-product basis. The seller may therefore be able to carefully balance the reduction in profit margin for each product with the overall level of spending made by the customer. For example, the discount prices of a given product may have a predefined relationship with the retail price of a the product. For example, the discount price may be set such that the difference between the retail price and the discount price for a high margin product is substantially greater than the difference between the retail price and the discount price of a low margin product. As a result, the benefit received by the retailer in generating additional sales volume can be set to outweigh the reduction in profit margins resulting from the discounts.

BRIEF DESCRIPTION OF THE DRAWINGS

FIG. 4B illustrates the prior art database of FIG. 4A storing illustrative data.

FIG. 6A illustrates a condition database in accordance with an embodiment of the present invention.

FIG. 6B illustrates a condition database in accordance with another embodiment of the present invention.

FIG. 6C illustrates a condition database in accordance with another embodiment of the present invention.

FIG. 7 illustrates a portion of the database of FIG. 5B and an illustrative display that indicates the various conditions of the condition database of FIG. 6A.

FIG. 8 illustrates a simplified example of a price database stored in the server of FIG. 3 in accordance with the invention.

FIG. 9A illustrates a database in which the data is organized according to a data structure in accordance with another embodiment of the present invention.

FIG. 9C illustrates similarly illustrates the database of FIG. 9A storing illustrative data for three products.

FIG. 10B illustrates the database of FIG. 10A storing illustrative data.

FIG. 10C illustrates a database that is substantially equivalent to the database depicted in FIG. 10B.

FIG. 15 illustrates an example of a record of a transaction database which is stored in a point of sale system according to an alternate embodiment of the invention.

FIG. 16A illustrates an example of a customer database which is stored in a point of sale system in accordance with an alternate embodiment of the invention.

FIGS. 17A and 17B are respectively illustrations of a team database and a customer database stored in a point of sale system according to still another alternate embodiment of the invention.

DETAILED DESCRIPTION OF THE INVENTION

Definitions

The following terms, as used herein, shall have the meanings indicated below.

access attempt: an attempt by a client computer to access a Web site hosted by a Web server computer.

average transaction value: an amount calculated by dividing a total dollar value of transactions during a period of time by the number of such transactions.

catalog order-taking facility: a facility at which telephone calls are received from customers and orders for merchandise are entered into a computerized order-processing system in response to customers' telephone calls.

client computer: a computer used by a customer to purchase products via the Internet.

corresponding first price: as to each second price, the "corresponding first price", as used in the appended claims, means the first price for the same product of merchandise.

customer service station: a computer terminal, personal computer, network computer or computer workstation connected to a computerized order-processing system at a catalog order-taking facility and used to enter orders for merchandise into the computerized order-processing system.

Internet: a matrix of computer networks that connects computers around the world.

monitor component: a video monitor, display, cathode ray tube, flat panel display, or other device connected to a computer or other user device (e.g. a pager or personal digital assistant) and used to display information to a user of the computer or other user device.

pricing qualification level: a dollar amount of purchases or combination of products which entitles a customer to discounted pricing.

product identifier: data that uniquely identifies a product and that indicates selection of a product to be purchased.

retail price: a price charged for a product when no discounted price applies.

retail outlet: a retail store, shopping Web site, catalog order-taking facility or other facility that offers products for customers to purchase.

transaction: an event in which a customer purchases one or more products from a seller.

Web server computer: a computer which hosts a shopping Web site.

product: a good or service that a customer may obtain from a retail outlet.

An embodiment of the invention will now be described with reference to FIGS. 1-3, 4A and 5-8.

Figure 1:
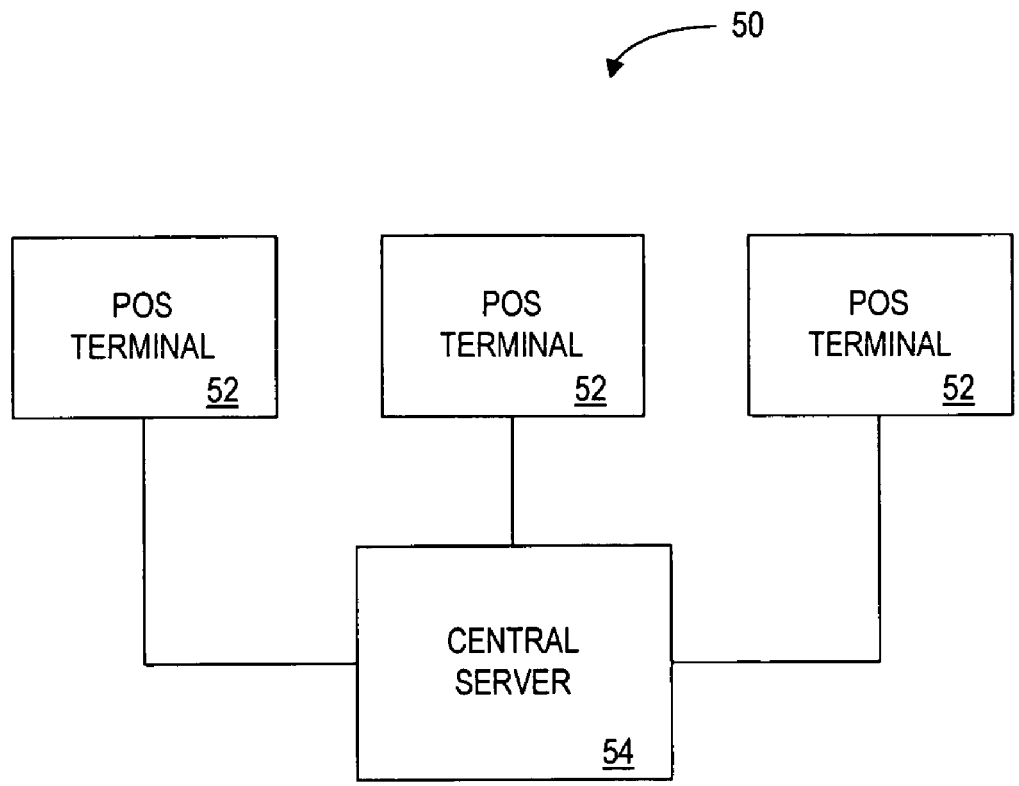
FIG. 1 is a block diagram of a point of sale system in which the present invention is applied.

Referring initially to FIG. 1, reference numeral 50 generally indicates a point of sale system in which a first embodiment of the invention is applied. It is preferred that the hardware making up the point of sale system 50 be of conventional design. The present embodiment will be described in the context of a retail outlet such as a supermarket, and the point of sale system may, for example, be constituted in terms of its hardware by point-of-sale terminal equipment and an associated data network of the type typically employed in a supermarket. As somewhat schematically illustrated in FIG. 1, the point of sale system 50 is shown as including point of sale (POS) terminals 52 and a central server unit 54 connected by data paths 56 to the POS terminals 52. Although only three POS terminals 52 are shown in FIG. 1, it will be recognized that in many cases a greater number of such terminals 52 will be installed in a retail store and connected to the central server 54. Of course, it is also contemplated to apply the invention in a point of sale system having fewer than three terminals.

Figure 2:
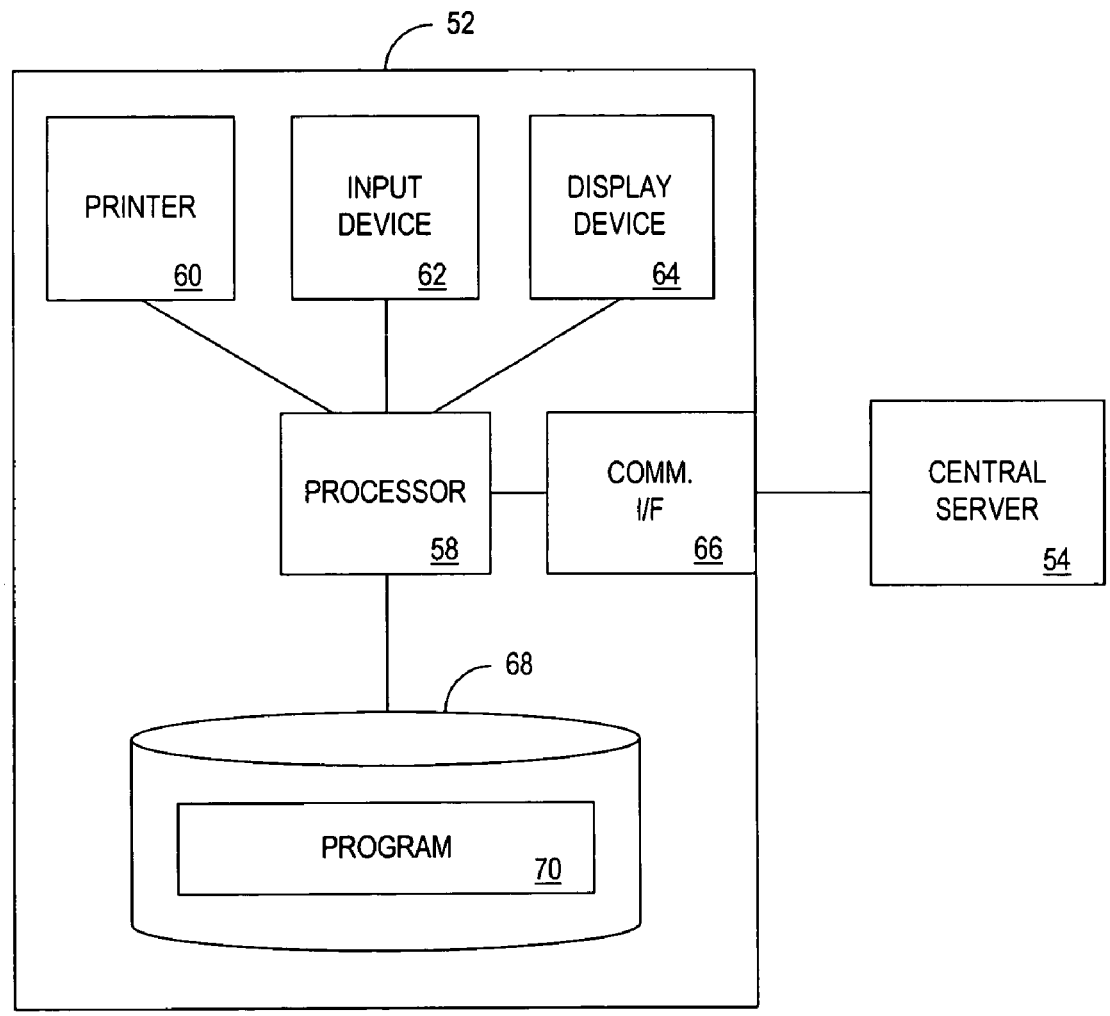
FIG. 2 is a block diagram showing some details of a point of sale terminal which is part of the system shown in FIG. 1.

FIG. 2 is a block diagram which shows some details of a typical one of the POS terminals 52.

The POS terminal 52 includes a processor 58 which controls operation of the POS terminal 52. The processor 58 may be one or more conventional microprocessors or microcontrollers. Other conventional components of the POS terminal 52, all of which are connected to the processor 58, include a printer 60 for printing, for example, sales receipts and credit card slips, one or more data input devices 62, such as, for example, a keyboard and a bar code reader, and a character and/or CRT display 64 which provides an indication, such as a visual indication, of product or other data inputted into, or being processed by, the POS terminal 52. Also connected to the processor 58 is a communications interface component 66 through which the processor 58 exchanges data with the central server 54.

Another component of the POS terminal 52 shown in FIG. 2 is a data memory device 68 which is accessible by the processor 58. A program 70 is stored in the data memory device 68. The program 70 controls the processor 58 to carry out functions of the present invention which will be described below.

Figure 3:
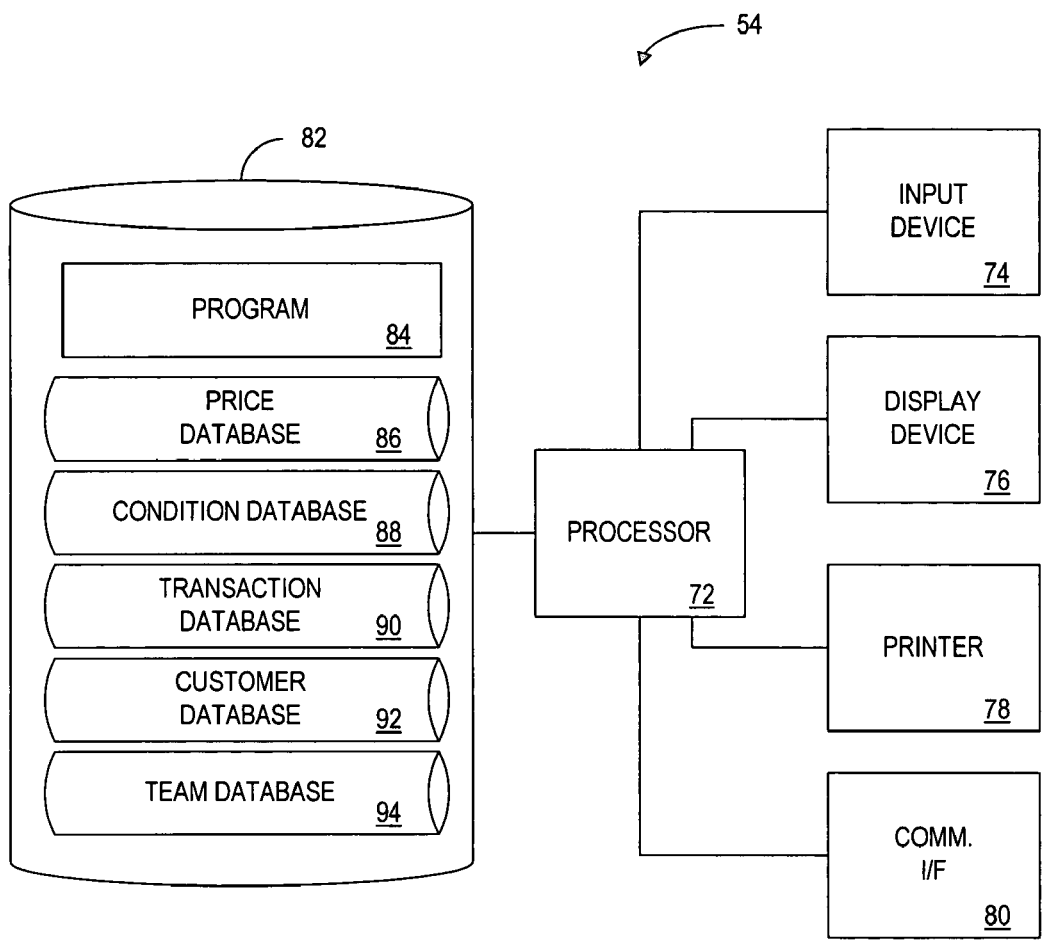
FIG. 3 is a block diagram which shows some details of a central server which is included in the system of FIG. 1 and has been programmed and loaded with database information in accordance with the invention.

Referring now to FIG. 3, some details of the central server 54 of FIG. 1 will now be described.

The central server 54 includes, and is controlled by, a processor 72. Processor 72 may comprise as one or more processors, such as one or more Pentium® microprocessors. If the processor comprises a plurality of microprocessors, the plurality of microprocessors may or may not operate in parallel. Connected to the processor 72 are conventional components such as an input device 74, a display device 76, a printer 78 and a communication interface 80. As is customary, the central server 54 is preferably realized using suitable personal computer, computer workstation or minicomputer hardware. The peripheral devices 74, 76 and 78 may comprise, for example, a keyboard/mouse, a computer monitor and a computer output printer, respectively. The communication interface 80 allows the processor 72 to exchange data with the POS terminals 52 via the data links 56 (FIGS. 1 and 2).

Continuing to refer to FIG. 3, the central server 54 also includes a data memory device 82, which is accessible by the processor 72 and preferably is a mass storage device such as a hard disk drive. The processor 72 is in communication with the data memory device 82. The data memory device 82 comprises an appropriate combination of magnetic, optical and/or semiconductor memory, and may include Random Access Memory (RAM), Read-Only Memory (ROM) and/or a hard disk. The processor 72 and the memory device 82 may each be (i) located entirely within a single computer or other computing device; (ii) connected to each other by a remote communication medium, such as a serial port cable, telephone line or radio frequency transceiver; or (iii) a combination thereof. In one embodiment, the central server 54 may comprise one or more computers that are connected to a remote server computer for maintaining databases.

The data memory device 82 stores a program 84 for controlling the processor 72. The processor 72 performs instructions of the program 84, and thereby operates in accordance with the present invention, and particularly in accordance with the methods described in detail herein. The program 84 may be stored in a compressed, uncompiled and/or encrypted format. The program 84 furthermore includes program elements that may be necessary, such as an operating system, a database management system and "device drivers" for allowing the processor 72 to interface with computer peripheral devices. Appropriate device drivers and other necessary program elements are known to those skilled in the art, and need not be described in detail herein.

The storage device 82 also stores (i) a price database 86, (ii) a condition database 88, (iii) a transaction database 90, (iv) a customer database 92, and (v) a team database 94. The databases 86, 88, 90, 92, and 94 are described in detail below and depicted with exemplary entries in the accompanying figures. As will be understood by those skilled in the art, the schematic illustrations and accompanying descriptions of the databases presented herein are exemplary arrangements for stored representations of information. A number of other arrangements may be employed besides those suggested by the databases shown. Similarly, the illustrated entries of the databases represent exemplary information, and those skilled in the art will understand that the number and content of the entries can be different from those illustrated herein.

The price database 86 includes pricing information for products to be sold in the store. The condition database 88 indicates conditions that have to be met to qualify for discount pricing tiers. The transaction database 90 stores information concerning purchase transactions carried out at the POS terminals. The customer database 92 stores information such as purchasing histories for customers of the store. The team database 94 stores data indicating "purchasing teams" (e.g. several customers associated together via the record in the customer database) with which store customers may be affiliated.

Figure 4A:
FIG. 4A illustrates a prior art database in which the data is organized according to a prior art data structure.

FIG. 4A is a table 4000 which depicts a prior art database in which the data is organized according to a prior art data structure. The data structure includes a product identifier data object 4001 and a price data object 4002 for the product identifier data object. The product identifier uniquely identifies a product and the price indicates the price to pay for that product.

Figure 4B:
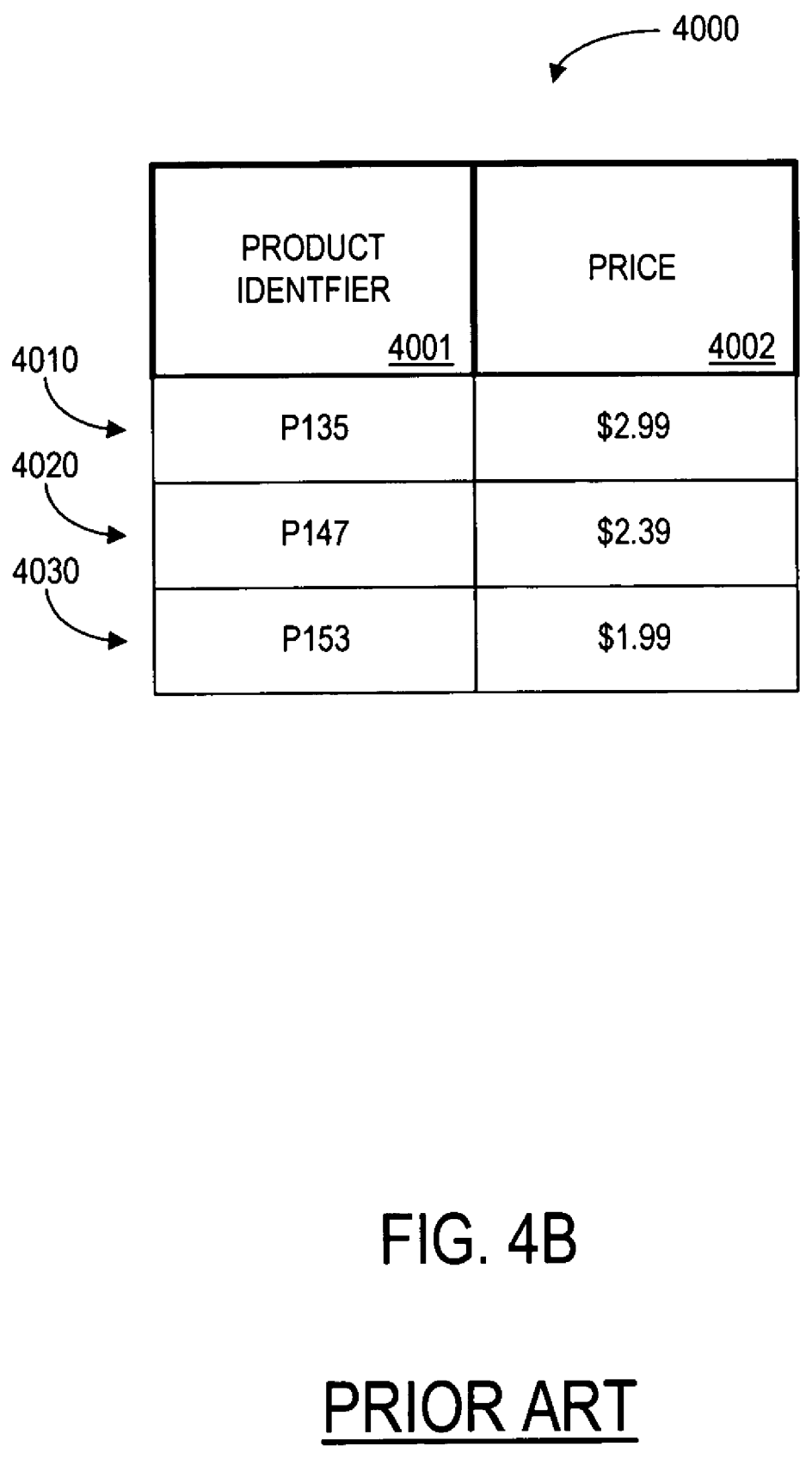

FIG. 4B depicts the prior art table 4000 of FIG. 4A storing illustrative data. Each of records 4010, 4020 and 4030 specifies a product and its price. Typically, in a conventional retail system, the POS terminal retrieves the price associated with a product, based on a product identifier, from table such as table 4000 and applies the retrieved price for the product to the current transaction.

Figure 5A:
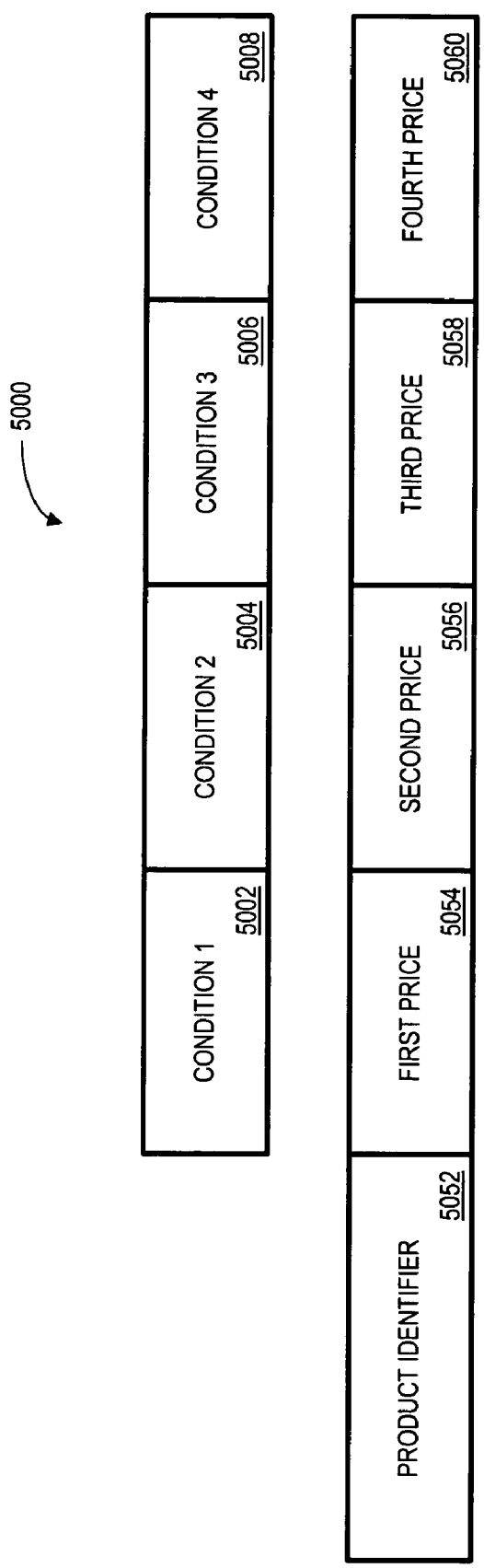
FIG. 5A illustrates a database in which the data is organized according to a data structure in accordance with the present invention.

FIG. 5A depicts a database in which the data is organized according to a data structure in accordance with the present invention. In one embodiment, such data is stored on a computer readable medium and is accessible by a program executed on a data processing system, also described herein.

The data structure includes a product identifier data object 5052 and a plurality of price data objects 5054, 5056, 5058 and 5060 for the product identifier data object 5052. The product identifier uniquely identifies a product and each price indicates the price to pay for that product under a particular condition. A condition table 5000 includes a respective condition data object 5002, 5004, 5006, and 5008 for each price data object 5054, 5056, 5058, and 5060. For example, condition data object 5002 corresponds to price data object 5054. When a condition is satisfied, the satisfied condition indicates one price which is to be paid for the product.

Figure 5B:
FIG. 5B illustrates the database of FIG. 5A storing illustrative data.

FIG. 5B depicts the database of FIG. 5A storing illustrative data. The product "P135" identified by reference numeral 5052 has four associated prices "$2.99" (5054), "$2.95" (5056), "$2.90" (5058) and "$2.75" (5060). The condition table 5000 includes condition data objects, 5002, 5004, 5006 and 5008 for the price data objects 5052, 5054, 5056 and 5058 respectively. The illustrative condition data objects 5002, 5004, 5006 and 5008 define conditions in terms of a value, and in particular in terms of ranges of the value. The value may be, for example, the purchase total of a single transaction, the purchase total of a plurality of transactions, or the average purchase total of a plurality of transactions. For illustrative purposes, FIG. 5B illustrates the conditions in terms of a purchase total (PT) value range. For example, FIG. 5B illustrates that the price of "$2.99" (5054) for product "P135" (5052) has an associated purchase total value range of $0 through $100. Thus, if a purchase total of a transaction is a value greater than $0 and less than $75, the price applied to the transaction for the product "P135" included in such a transaction is $2.99. If however, the purchase total of a transaction is a value greater than $75 and not greater than $100, then the price for the product "P135" as applied to such a transaction is $2.95, as indicated by the condition value range 5004 and the corresponding price data object 5056.

The condition data objects may define mutually exclusive conditions. For example, if the condition data objects define conditions in terms of ranges of a value, the ranges may be mutually exclusive (i.e. non-overlapping). Similarly, the condition data objects may define exhaustive conditions such that under any conditions at least one condition is always satisfied. Thus, if the condition data objects define both mutually exclusive conditions and exhaustive conditions, then under any conditions exactly one condition is satisfied.

Figure 6A:
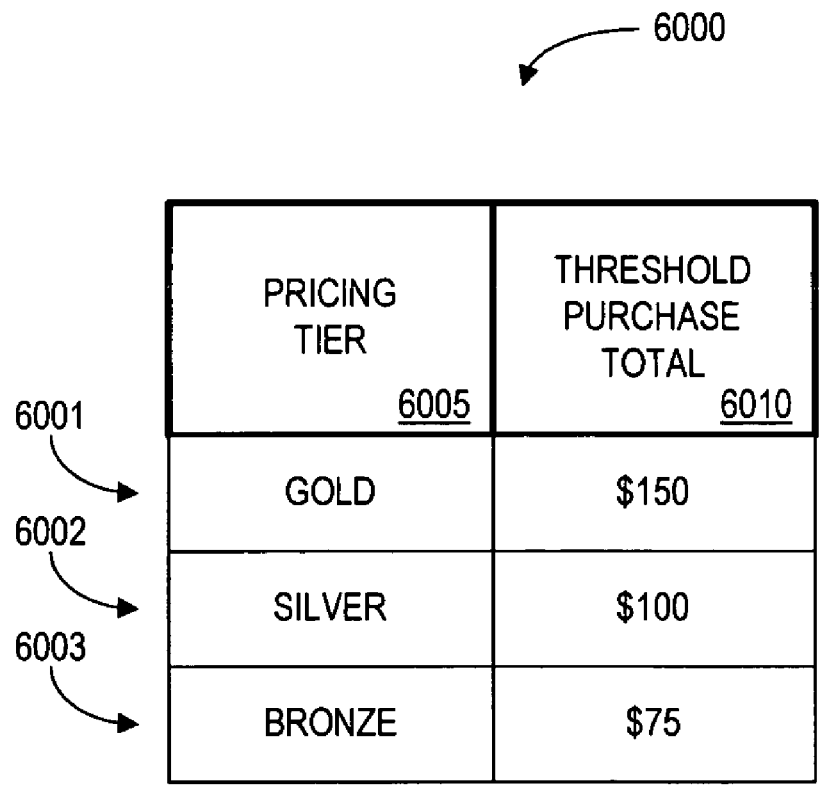

FIG. 6A is a condition table 6000, which illustrates an embodiment of the condition database 88 of the central controller of FIG. 3, in accordance with another embodiment of the present invention. The condition table 6000 includes a plurality of records 6001, 6002, and 6003, each record specifying a pricing tier name 6005 and a condition 6010 that corresponds to that pricing tier name. The condition table 6000 defines conditions in terms of a value, and in particular in terms of ranges of the value. Each range is defined by a value and the value(s) of other record(s). In FIG. 6A, this value is the purchase total threshold. For example, the record 6001 specifies a pricing tier named "GOLD" and a value "$150". The record 6002 specifies a pricing tier named "SILVER" and a value "$100". The record 6001 thus defines a range "greater than $150", and the record 6002 defines a range "between $100 and $150".

FIG. 6B is a condition table 6020, which illustrates an embodiment of the condition database 88 of the central controller of FIG. 3, in accordance with another embodiment of the present invention. The condition table 6020 is similar to the condition table 6000 of FIG. 6A, and likewise includes a plurality of records 6021, 6022, 6023, and 6024, each record specifying a pricing tier name 6025 and a condition 6030. However, the condition table 6020 defines conditions in terms of explicit ranges of a value within each record 6021, 6022, 6023, and 6024. For example, record 6022 defines the purchase total (PT) range for the "Silver" pricing tier as a value not less than $100 and less than $150.

FIG. 6C is a condition table 6050, illustrative of the condition database 88 of the central controller 54 (FIG. 3), in accordance with another embodiment of the present invention. The condition table 6050 is similar to the condition table 6000 of FIG. 6A, and likewise includes a plurality of records 6051, 6052, 6053, and 6054, each record specifying a pricing tier name 6055 and a condition 6060 that corresponds to each respective pricing tier name. However, in FIG. 6C the condition table 6050 defines conditions in terms of a number of "qualifying" products that are purchased, rather than in terms of a purchase total.

FIG. 7 is a portion 7000 of the database of FIG. 5B for ease of illustration. The illustrative portion 7000 is of the type that may be presented to a customer on a shelf label to inform the customer of the possible prices for a product. In a preferred embodiment of the invention, prices corresponding to three discount tiers, in addition to the retail price, are assigned to many or all of the products sold in the store, and shelf labels in the format shown in the illustrative portion 7000 are displayed on store shelves adjacent to all of the products to which the discount prices have been assigned. FIG. 7 also depicts an illustrative display 7050 that indicates the various conditions of the condition table 6A. The illustrative display 7050 is of the type that may be presented to a customer to inform the customer of the conditions, which in the present example are based on the purchase total. It is contemplated that, in one embodiment of the present invention, the illustrative display 7050 and/or the illustrative portion 7000 may be in digital format and the pricing tier threshold purchase totals and corresponding product prices are changed dynamically based on current sales volume or other conditions.

FIG. 8 is a table 8000 which is illustrative of one embodiment of the price database 86 of the central controller 54 (FIG. 3). The table 8000 is similar to the portion 7000 of FIG. 7, yet specifies a plurality of products. In an embodiment such as illustrated in FIG. 8, each condition corresponds to a respective subset of the prices. Each respective subset of prices includes one respective price for each of the product identifiers. In addition, for any product, each price corresponds to one respective condition. For example, the condition "GOLD PRICE" corresponds to a subset of prices that includes the first price of each of the product identifiers. The product identified by "P101" has four prices, each corresponding to one of the respective conditions "GOLD PRICE", "SILVER PRICE", "BRONZE PRICE" and "RETAIL PRICE".

Table 8000 includes a number of records 8001, 8002, 8003, 8004, 8005 each of which has six attributes, corresponding to the six columns shown table 8000. The six columns respectively are indicated in table 8000 as denoting the "product identifier" (reference numeral 8010), which may be an alphanumeric string of digits that uniquely identify the product in question; the product description (reference numeral 8020); prices corresponding to a "gold" discount pricing tier (reference numeral 8030), which, in the illustrated embodiment, are the most favorable prices from the customer's point of view; prices corresponding to a "silver" pricing tier (reference numeral 8040), which, in the illustrated embodiment, is a tier that is less favorable than the gold tier; prices corresponding to a "bronze" discount pricing tier (reference numeral 8050), which, in the illustrated embodiment, is a tier of prices that is less favorable than the silver tier, and the retail pricing tier (reference numeral 8060) which represent the prices at which products are sold when no discount is applicable. In the examples provided in table 8000, the bronze price for each product is lower than the retail price, the silver price for each product is lower than the bronze price, and the gold price for each product is lower than the silver price; except that for one product, "P105", granola cereal, the pricing in all four tiers is the same. Of course it is understood that any number and hierarchical order of pricing tiers could be used in accordance with the present invention.

The example of FIG. 8 illustrates the great flexibility in varying the pricing from tier to tier and varying the discount structure from product to product that is a key advantage of the present invention. For example, if the information for one of the products other than "granola cereal" is examined, it will be noted that the decrease in price from one tier to the other is variable. For instance, in the case of product "P101", "cream cheese", the reduction in price in the bronze tier relative to the retail pricing tier is 5¢, whereas the decrease in the silver discount pricing tier as compared to the bronze discount pricing tier is 10¢, and the reduction in price from the silver discount pricing tier to the gold discount pricing tier is 15¢.

It will also be observed that looking across all of the products, the changes in price from one tier to another tier need not be uniform across the different products. For example, the reduction in price from the silver discount pricing tier to the gold discount pricing tier for cream cheese is just under 10%, the reduction in price for orange juice between the two discount pricing tiers is just under 5%, but the reduction in price for rye bread is in excess of 20%.

FIG. 9A illustrates a database in which the data is organized according to a data structure in accordance with another embodiment of the present invention. The data structure includes a product identifier data object 9002 and a plurality of price data objects 9004, 9006, and 9008 for the product identifier data object. The product identifier uniquely identifies a product and each price indicates the price to pay for that product under a particular condition. The product identifier data object is also associated with its own condition table 9010, which includes a respective condition data object 9012, 9014, and 9016 for each price data object. When a condition is satisfied, the satisfied condition indicates one price which is to be paid for the product.

In contrast to the embodiment presented in FIG. 5A, in the embodiment depicted in FIG. 9A each product is associated with its own condition table. Accordingly, different products may have different conditions under which various prices are applicable, and different products may have different numbers of prices. In fact, the conditions of different products may be defined in different terms. For example, a first product may have prices based on the purchase total, while a second product has prices based on a number of qualifying products that are purchased.

Figure 9B:
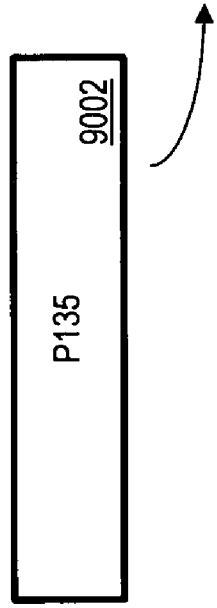
FIG. 9B illustrates the database of FIG. 9A storing illustrative data.

FIG. 9B illustrates the database of FIG. 9A storing illustrative data. The product identified by reference numeral 9002 has four associated prices $2.99 (9004), $2.95 (9006), and $2.90 (9008). The condition table 9010 for the product includes condition data objects 9012, 9014, and 9016 for the price data objects 9004, 9006, and 9008 respectively. The illustrative condition data objects 9012, 9014, and 9016 define conditions in terms of a value, and in particular in terms of ranges of a purchase total. For example, the condition data object 9014 defines the condition of a purchase total (PT) range of $75 to $100. Thus, if the condition of condition data object 9014 is met, the price indicated by corresponding price data object 9006 is applied for product "P135." That is, if a purchase total of a transaction is greater than $75 but not greater than $100, the price applied to the transaction for product "P135" is $2.95.

FIG. 9C is table 1000 and similarly depicts the database of FIG. 9A storing illustrative data for three products. The product identified by reference numeral 1010 has two associated prices 1012 and 1014. The condition table 1015 for the product 1010 includes condition data objects 1016 and 1018 for the price data objects 1012 and 1014 respectively. The illustrative condition data objects 1016 and 1018 define conditions in terms of ranges of a purchase total.

The product identified by reference numeral 1020 also has two associated prices 1022 and 1024. The condition table 1025 for the product 1020 includes condition data objects 1026 and 1028 for the price data objects 1022 and 1024 respectively. The illustrative condition data objects 1026 and 1028 also define conditions in terms of ranges of a purchase total.

The product identified by reference numeral 1030 has three associated prices 1032, 1034 and 1036. The condition table 1037 for the product 1030 includes condition data objects 1038, 1039 and 1040 for the price data objects 1032, 1034 and 1036 respectively. The illustrative condition data objects 1038, 1039 and 1040 also define conditions in terms of ranges of a purchase total.

Figure 10A:
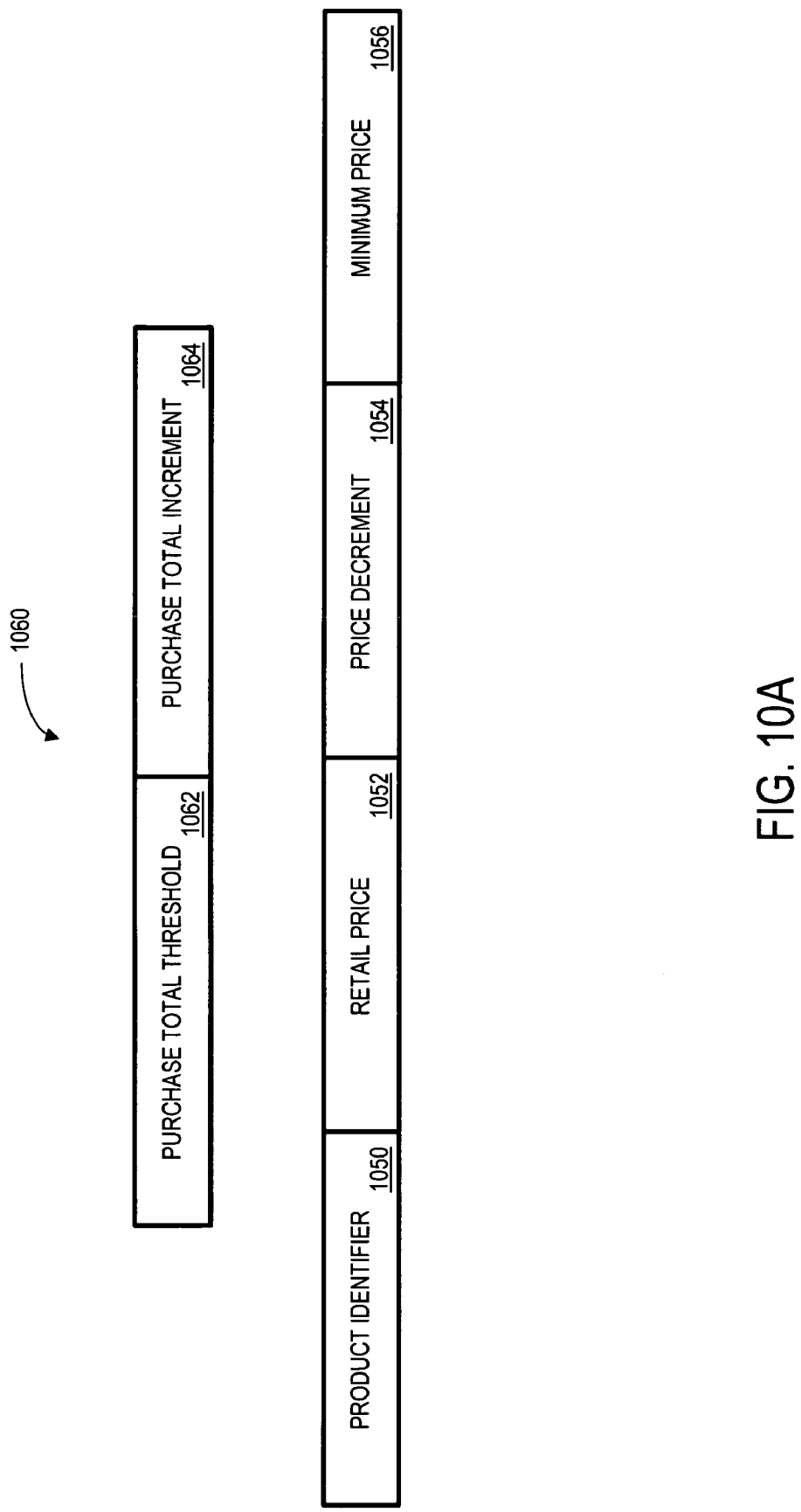
FIG. 10A illustrates a database in which the data is organized according to a data structure in accordance with another embodiment of the present invention.

FIG. 10A depicts a database in which the data is organized according to a data structure in accordance with another embodiment of the present invention. The data structure includes a product identifier data object 1050 and data objects 1052, 1054 and 1056 that indirectly define price data objects for the product identifier data object. In particular, in the illustrated embodiment the data objects 1052, 1054 and 1056 indicate a retail price, a price decrement and a minimum price respectively. The data objects 1052, 1054 and 1056 thus define a set of prices ranging from the retail price to the minimum price, each such price separated by the magnitude of the price decrement.

The data structure also includes a condition table 1060 which includes data objects 1062 and 1064. The data objects 1062 and 1064, which indicate a purchase total threshold and a purchase total increment respectively, define ranges of the purchase total. The ranges start with the range of purchase totals less than the purchase total threshold, and each subsequent range spans the purchase total increment, except for the final range which spans the values not encompassed by the other ranges.

FIG. 10B illustrates the database of FIG. 10A storing illustrative data. The data structure includes product identifier data object 1050 and data objects 1052, 1054 and 1056 that indicate a retail price of $2.99, a price decrement of $0.05 and a minimum price of $2.69 respectively. The data objects 1052, 1054 and 1056 thus define a set of prices ranging from the $2.99 to $2.69, each such price separated by $0.05.

The data structure also includes a condition table 1060 which includes data objects 1062 and 1064. The data objects 1062 and 1064 indicate a purchase total threshold of $50.00 and a purchase total increment of $10.00 respectively. The ranges thus defined start with the range of purchase totals less than $50.00, and each subsequent range spans $10.00, except for the final range which spans the values not encompassed by the other ranges.

FIG. 10C illustrates a database that is substantially equivalent to the database depicted in FIG. 10B. In particular, in the database of FIG. 10C the data is arranged according to the data structure introduced in FIG. 5. The product identified by reference numeral 1070 has seven associated prices. The condition table 1080 likewise has seven conditions, one for each of the seven prices. The prices range from $2.99 to $2.69, each such price separated by $0.05. The conditions define ranges of purchase total, starting with the range of purchase totals less than $50.00. Each subsequent range spans $10.00 (e.g. between $50 and $60), except for the final range which spans the values not encompassed by the other ranges (i.e. purchase totals greater than $110). The data structure of FIG. 10B thus effectively "compresses" the data of FIG. 10C. Accordingly, the data structure of FIG. 10B can be more efficient in certain embodiments.

Figure 11A:
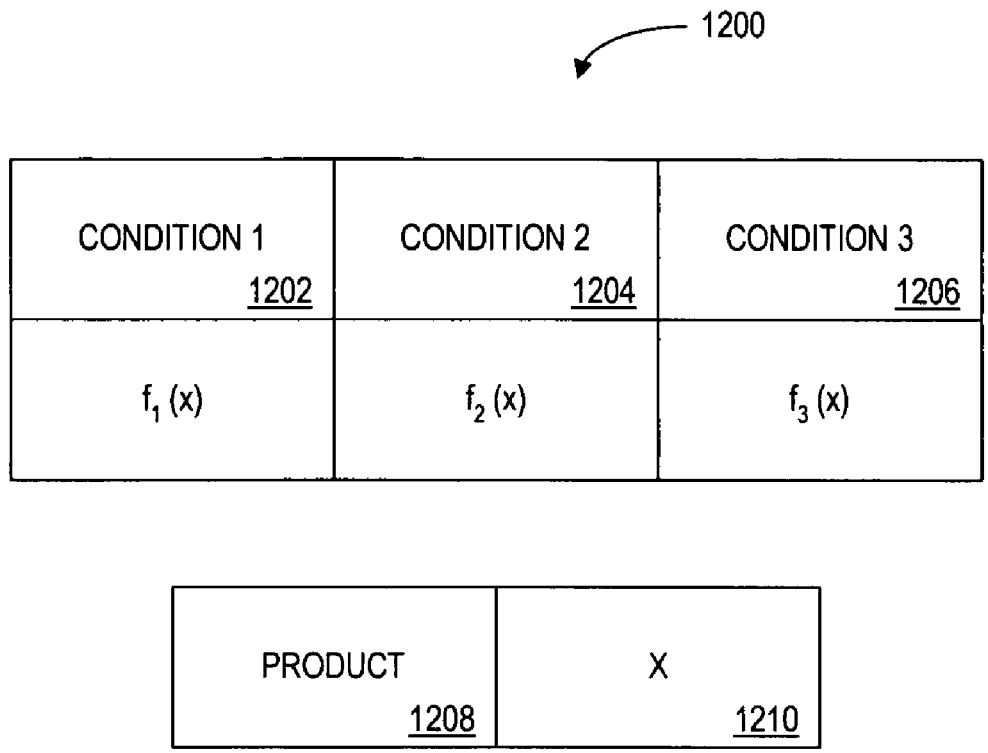
FIG. 11A illustrates a database in which the data is organized according to a data structure in accordance with another embodiment of the present invention.

FIG. 11A illustrates a database in which the data is organized according to a data structure in accordance with another embodiment of the present invention. The data structure includes a product identifier data object 1208 and a data object 1210 that indirectly defines price data objects for the product identifier data object.

The data structure also includes a condition table 1200 which includes data objects 1202, 1204 and 1206. The data objects 1202, 1204 and 1206 each define a function to operate on the data object 1210 of the product data object 1208. Each of the data objects 1202, 1204 and 1206 thus cooperates with the data object 1210 to define one price for the product. The functions defined by the data objects 1202, 1204 and 1206 may be any function of one or more variables. Similarly, the data object 1210 store values for the one or more variables.

Figure 11B:
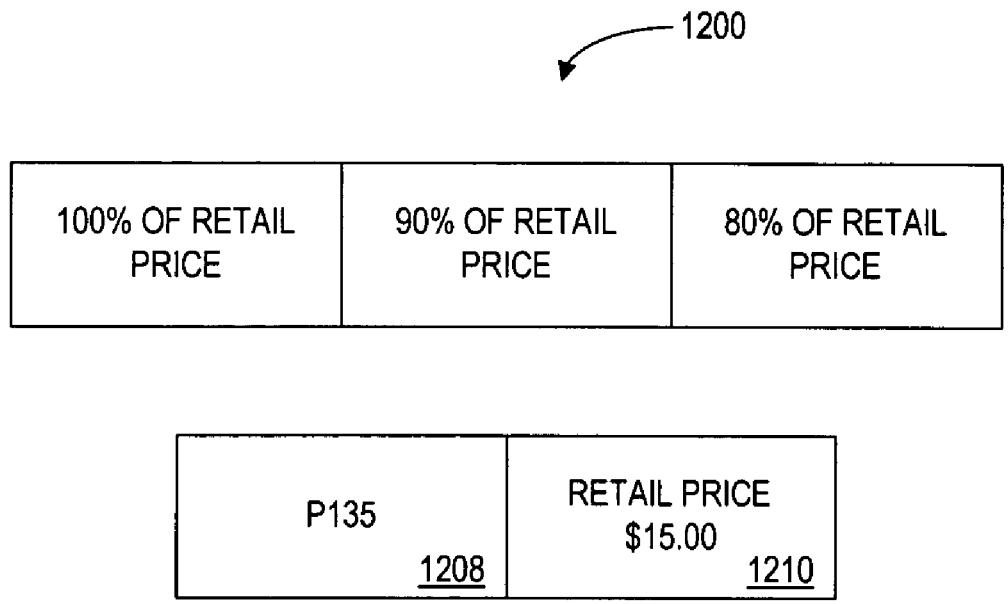
FIG. 11B illustrates the database of FIG. 11A storing illustrative data.

FIG. 11B illustrates the database of FIG. 11A storing illustrative data. The data structure includes a product identifier data object 1208 and a data object 1210 that defines a retail price of $15.00. This retail price will indirectly define price data objects for the product identifier data object 1208. The condition table 1200 includes data objects 1202, 1204 and 1206, which define the functions "100% of Retail Price", "90% of Retail Price" and "80% of Retail Price" respectively. Each of the data objects 1202, 1204 and 1206 thus cooperates with the retail price to define one price for the product. Specifically, the data objects 1202, 1204 and 1206 and the retail price define the prices $15.00, $13.50, and $12.00, respectively.

The following flowcharts are described as being carried out by either a POS terminal or the central server 54. It is understood that where the process is described as being performed by a POS terminal it could alternately be performed by the central server 54 and, similarly, where a process is described as being performed by the central server it may alternately be performed by a POS terminal. Also, each of the following processes could be performed by a combination of the central server 54 and one or more POS terminals. For example, some of the data could be received by a POS terminal and transmitted to the central server 54 or the POS terminal could transmit a request to the central server based on the received data; the central server 54 could perform an analysis on any transmitted data, retrieve more data from a database based on the transmitted data or request; the central server 54 can then transmit the results of the analysis or the additional data back to the POS terminal from which the original data or request had been received; and the POS terminal could apply the result or data to the current transaction. For example, the product identifiers of the products included in a transaction may be received by a POS terminal and transmitted to the central server 54. The central server 54 could then (i) calculate an initial purchase total, (ii) determine which pricing tier is applicable, (iii) calculate a final purchase total based on the applicable pricing tier, and (iv) transmit the final purchase total (perhaps along with an indication of the pricing tier that was used to calculate it) to the POS terminal from which the product identifiers had been received. The POS terminal could then apply the final purchase total to the transaction.

Figure 12:
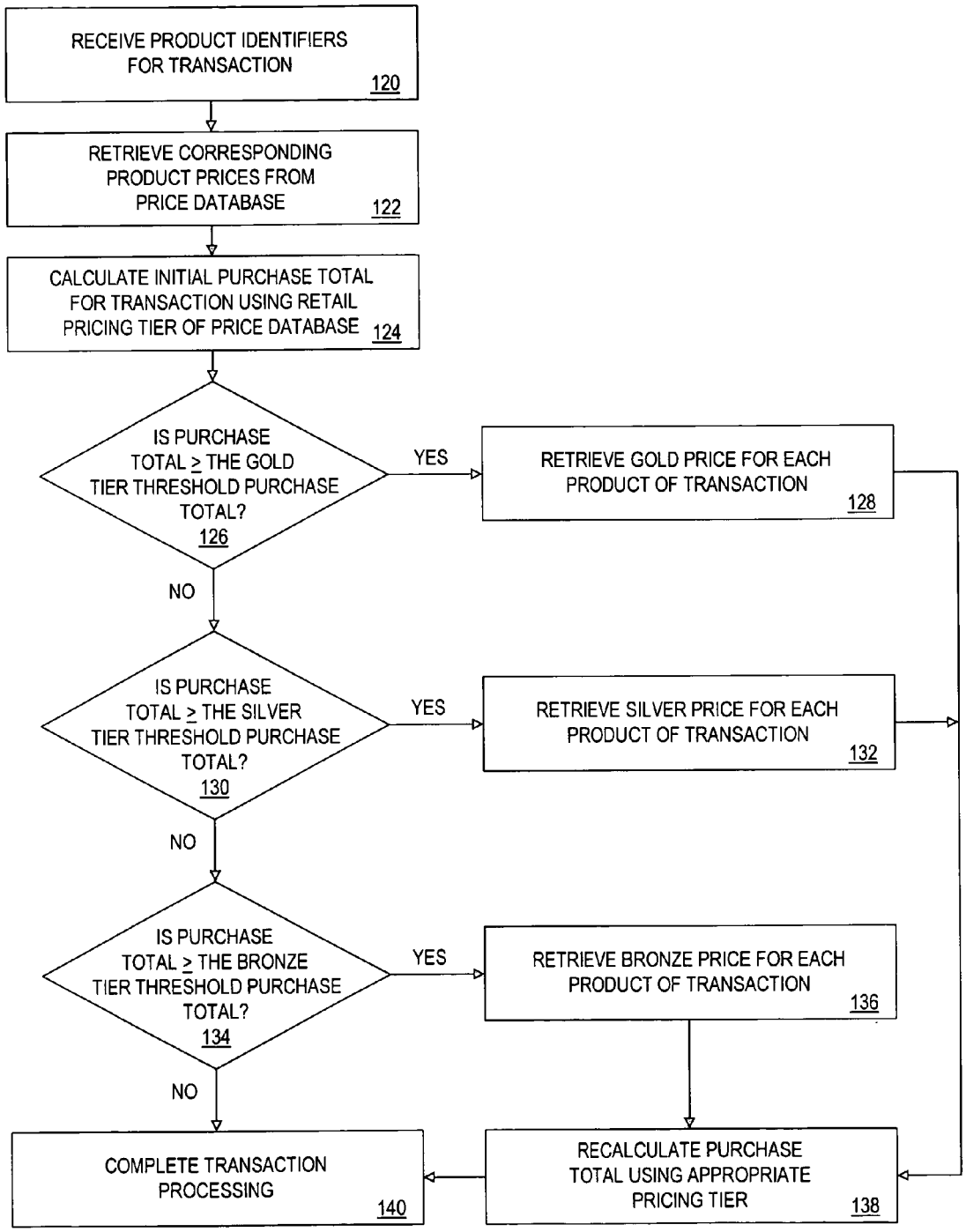
FIG. 12 is a flowchart which illustrates a process carried out, in accordance with the invention, to calculate a purchase total for a transaction by using multi-tiered product discount pricing.

FIG. 12 is a flowchart which illustrates a process carried out by the POS terminal 52 (FIG. 2) under control of the program 70 for the purpose of implementing the present invention. Initially in the process of FIG. 12, the product identifiers for the products to be purchased are received by the POS terminal (step 120). Typically, the product identifiers are entered into the POS terminal by using a bar code scanner that is in communication with the POS terminal to read bar codes on the products. It is noted that machine readable indicia other than bar codes may be utilized to identify products in accordance with the invention. Of course, data identifying the products may also be entered by manually entering the product identifier into the POS terminal using a keyboard or by other known processes.

Next, at step 122, the POS terminal retrieves the "retail" (i.e., non-discounted) prices for the products represented by the product identifiers received at step 120. This pricing information is obtained from the central server 54, and particularly from the price database 86 shown in FIG. 3. The step 122 may comprise the POS terminal retrieving the retail prices for the products once all of the product identifiers for a given transaction have been received or the POS terminal may retrieve the retail price for each product as the corresponding product identifier is received. Then, at step 124, the POS terminal 52 calculates an initial purchase total for the transaction by totaling the retail prices for the products that are being purchased in the transaction.

Following step 124 is a decision block 126, at which it is determined whether the initial purchase total calculated at step 124 is at least equal to the threshold purchase total which qualifies for gold tier pricing. In the example illustrated in FIG. 6A, the threshold purchase total for the gold pricing tier is $150, and if this amount is equaled or exceeded by the initial purchase total, then the gold tier prices for each product in the transaction are retrieved from the price database, as indicated at step 128.

If at step 126 it was found that the initial purchase total does not equal or exceed the threshold purchase total for the gold discount pricing tier, then it is determined, at decision block 130, whether the threshold purchase total for the silver discount pricing tier is satisfied. If so, the corresponding prices of the silver tier are retrieved from the price database for each product of the transaction (step 132). If it is found at step 130 that the threshold purchase total for the silver tier is not satisfied, then a decision block 134 follows block 130. At block 134 it is determined whether the threshold purchase total for the bronze tier has been satisfied. If so, the bronze tier price for each product of the transaction is retrieved from the price database (step 136).

Assuming that any one of the three threshold purchase total is satisfied by the purchase total, then a step 138 is performed after the applicable one of steps 128, 132 and 136. At step 138 the purchase total is recalculated using the appropriate prices retrieved at step 128, 132 or 136, as the case may be. Essentially, the recalculation referred to at step 138 consists of assigning the appropriate discount price to each product of the transaction and totaling the discount prices. Although the term "discount" was used in the preceding sentence, it will be recognized that in some cases the price for a product in one or more of the discount pricing tiers may be the same as the retail price for the product.

After step 138, the POS terminal takes whatever further actions may be required to complete the transaction, as indicated at step 140. For example, the POS terminal may calculate a sales tax based on the transaction total. In addition, as part of step 140 the POS terminal may print a receipt for the transaction, process a credit card payment, or calculate change from an amount tendered.

It should also be noted that in the event that none of the discount pricing tier thresholds are met, step 140 is performed immediately after step 134. In the latter case, the initial purchase total for the transaction, based on the retail prices for the products purchased, is used as the transaction total, and the activities carried on in step 140, including calculation of sales tax and credit card payment processing, etc., are based on non-discounted (i.e. retail) prices for the products purchased.

The foregoing discussion of the process of FIG. 12 has not explicitly taken into account the information which may be displayed on the display device 64 (FIG. 2) of the POS terminal. The present invention contemplates that, during steps 120-124, information corresponding to the products to be purchased and the retail prices therefor may be displayed in accordance with conventional practice as the product identifier for each product is received and the corresponding retail price retrieved. In addition, the initial purchase total may be displayed with an additional legend such as "total before any discount earned". Then, if it is determined that one of the discount pricing tiers is applicable, the display device 64 may rapidly display a sequence of the pertinent discount prices for each of the products purchased as the relevant one of steps 128, 132 and 136 is performed. During step 138, the recalculated purchase total may be displayed with a legend such as "adjusted total based on gold prices" (or silver or bronze, as the case may be).

To summarize the process illustrated in FIG. 12, a first (retail or non-discounted) price is retrieved for each product to be purchased, and is used to calculate an initial purchase total. If the purchase total is at least equal to a threshold purchase total which corresponds to a discount pricing tier, then the respective prices from the discount pricing tier for each product to be purchased are retrieved. The prices from the relevant discount pricing tier may be regarded as "second" prices for the products, and these second prices are totaled to calculate a reduced purchase total for the transaction.

By using a technique of this type, which is based on one or more discount prices assigned to products to be purchased, in addition to a non-discounted price, the retailer can precisely tailor its discounting plan to maximize the plan's effectiveness while reducing or eliminating discounts on products which have a low profit margin.

According to one modification of the discount technique illustrated in FIG. 12, the reduced purchase total calculated at step 138 may be compared with the threshold for the discount pricing tier which was applied, and the discount pricing may be modified or reversed if the reduced purchase total fails to satisfy the threshold purchase total for the corresponding discount pricing tier.

Another embodiment of the present invention contemplates that the format of the shelf display shown in FIG. 6 may be modified to present the discount pricing tiers in terms of "cents off" or "percent off". In particular, for cream cheese, the gold price could be stated as "30¢ off"; the silver price as "15¢ off"; and the bronze price as "5¢ off". (Of course, another phrasing such as "save 30¢" could also be used.)

It is also contemplated to change the format of the price database 86 so that the discount prices for each product are defined in terms of an amount or percentage to be subtracted from the retail price.

In the embodiment of the invention which was described with reference to FIG. 12, the criterion used to determine whether discount pricing should be applied was the initial purchase total of the transaction, as calculated based on non-discounted prices.

Figure 13:
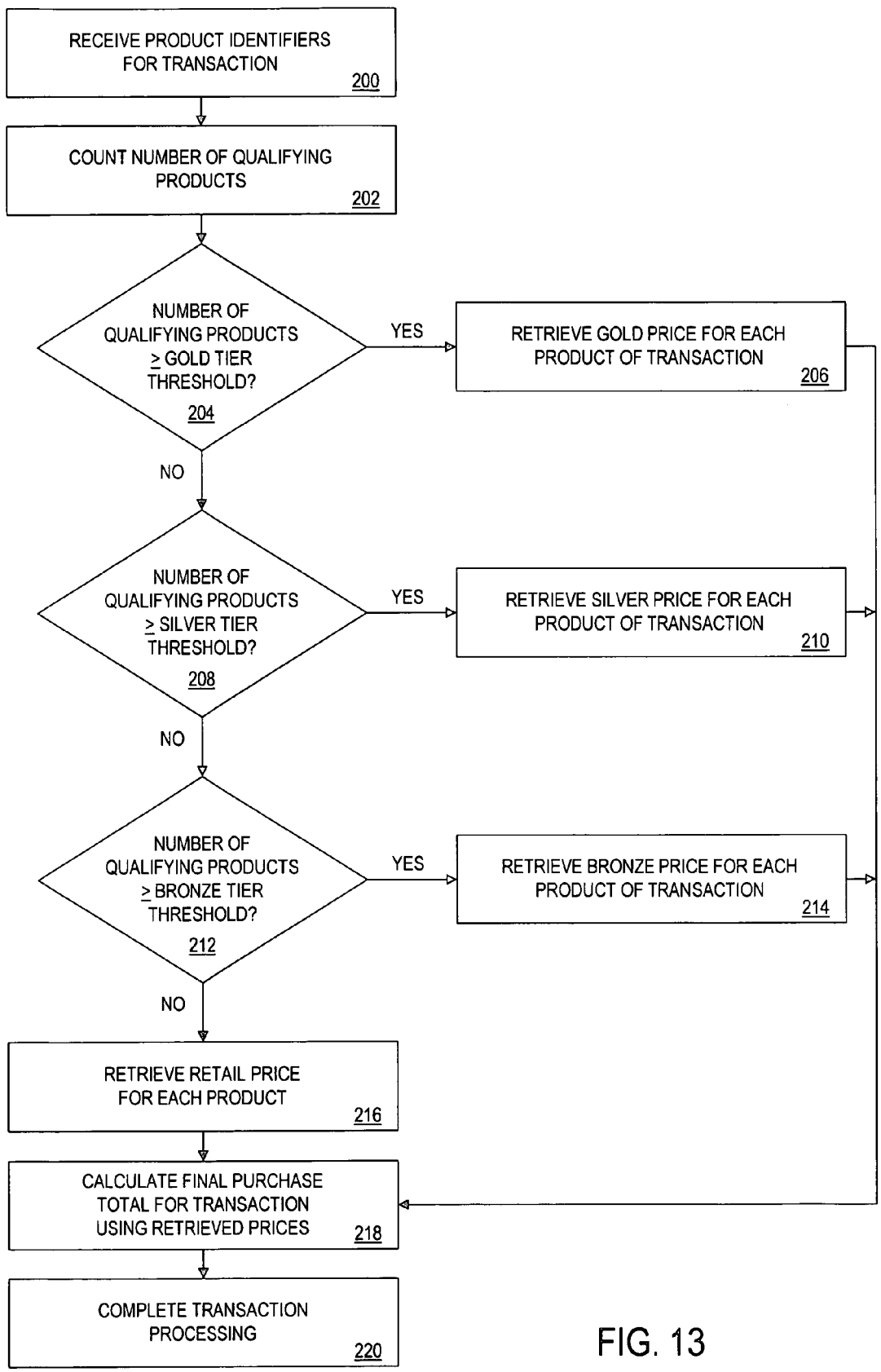
FIG. 13 is a flowchart which illustrates a process carried out according to an alternate embodiment of the invention, in which a customer qualifies for a discount pricing tier by purchasing a particular number of qualifying products.

FIG. 13 illustrates an alternate embodiment of the invention, in which the discount qualification criterion is the number of products of a certain type which are included in the transaction. For example, qualification for a discount may depend on the number of products of a certain brand, such as a store brand, which the customer purchases at one time. The POS terminal may determine which products are store brand products by, for example, the product identifier of the product (e.g. one or more digits of the product identifier identifies the product as a store brand product). According to a more specific example, for the "gold, silver, bronze" pricing scheme referred to above, purchase of 10 store brand products would be required to qualify for the gold pricing tier, while purchase of 8 store brand products would be required for the silver prices and 6 store brand products for the bronze prices.

The process of FIG. 13 begins with step 200, in which, as in step 120 of FIG. 12, product identifiers are received for each product to be purchased.

When the product identifiers for every product in the transaction have been received by the POS terminal, the total number of qualifying products is determined (step 202). For example, the POS terminal cashier may actuate a "total"

button on the POS terminal to indicate that no more product identifiers are to be received, which triggers the process of FIG. 13. In the example which was referred to above, it was assumed that qualifying products were those which carry a store brand. On the basis of the total number of store brand products included in the transaction, a decision block 204 is carried out. The POS terminal may determine whether a product is a store brand product based on, for example, the product identifier (e.g. one or more digits of the product identifier could identify the product as a store brand product). Of course, those skilled in the art of POS systems will recognize many ways of determining the number of store brand products included in a transaction. At block 204, it is determined whether the number of store brand products included in the transaction is at least equal to the threshold number of store brand products for the gold discount pricing tier. If so, the respective gold discount price for each product in the transaction is retrieved, as indicated at step 206.

If at step 204 the number of qualifying (e.g. store brand) products is not found to satisfy the threshold number of qualifying products for the gold discount pricing tier, then a decision block 208 follows block 204. At block 208 it is determined whether the number of qualifying products is at least equal to the threshold number of qualifying products for the silver discount pricing tier. If so, the respective prices from the silver tier for each product of the transaction are retrieved, as is indicated by step 210.

If the determination at block 208 is that at least the threshold number of qualifying products are not included in the transaction, a decision block 212 follows block 208. At decision block 212, it is determined whether the number of qualifying products is at least equal to the threshold required to qualify for the bronze discount pricing tier. If such is the case, then the respective bronze discount pricing tier price for each product of the transaction is retrieved from the price database, as indicated at step 214.

If the determination at block 212 is in the negative, then the retail prices for each product in the transaction are retrieved, as indicated at step 216. Following the applicable one of steps 206, 210, 214 and 216 is a step 218, at which a final purchase total for the transaction is calculated using the applicable prices which were retrieved for the products in the transaction. After step 218 other conventional processes required to complete the transaction are carried out, as indicated in step 220, and as previously discussed in connection with step 140 in FIG. 12.

In the process just described, it was assumed that if a qualifying number of store brand products were purchased, then all products in the transaction would be accorded discounted pricing from the appropriate discount pricing tier. However, this process may be modified so that the discounted prices are applied only to the qualifying products themselves, e.g., only to store brand products. If the embodiment of FIG. 13 is modified in this manner, then retail prices would be applied to all products which do not carry the store brand or otherwise non-qualifying products.

An advantage of the embodiment of FIG. 13 is that the retailer is permitted to use a flexible discounting plan to promote sales of certain products such as, for example, store brand products, perishable products, or high margin products.

A further embodiment of the invention will now be described with reference to FIGS. 10A, 10B, and 10C. In this embodiment, instead of defining discount pricing tiers, with corresponding prices in each tier assigned to each product available for purchase, the price database defines the discounted prices in terms of decrements to be applied to a retail price of a given product. The decrements are applied on the basis of purchase total thresholds and purchase total increments, which may be varied from product to product and tier to tier. The price decrement also may vary from product to product and from tier to tier. In one variation of this embodiment, the price decrement for a given product may increase as the purchase total increases. For example, the system of the invention could decrement the retail price of the product by 2¢ for every $10 increment in the purchase total between a purchase total threshold of $50 and a purchase total of $100 and then decrement the retail price of the product by 5¢ for every subsequent $10 increment in the purchase total.

Figure 14:
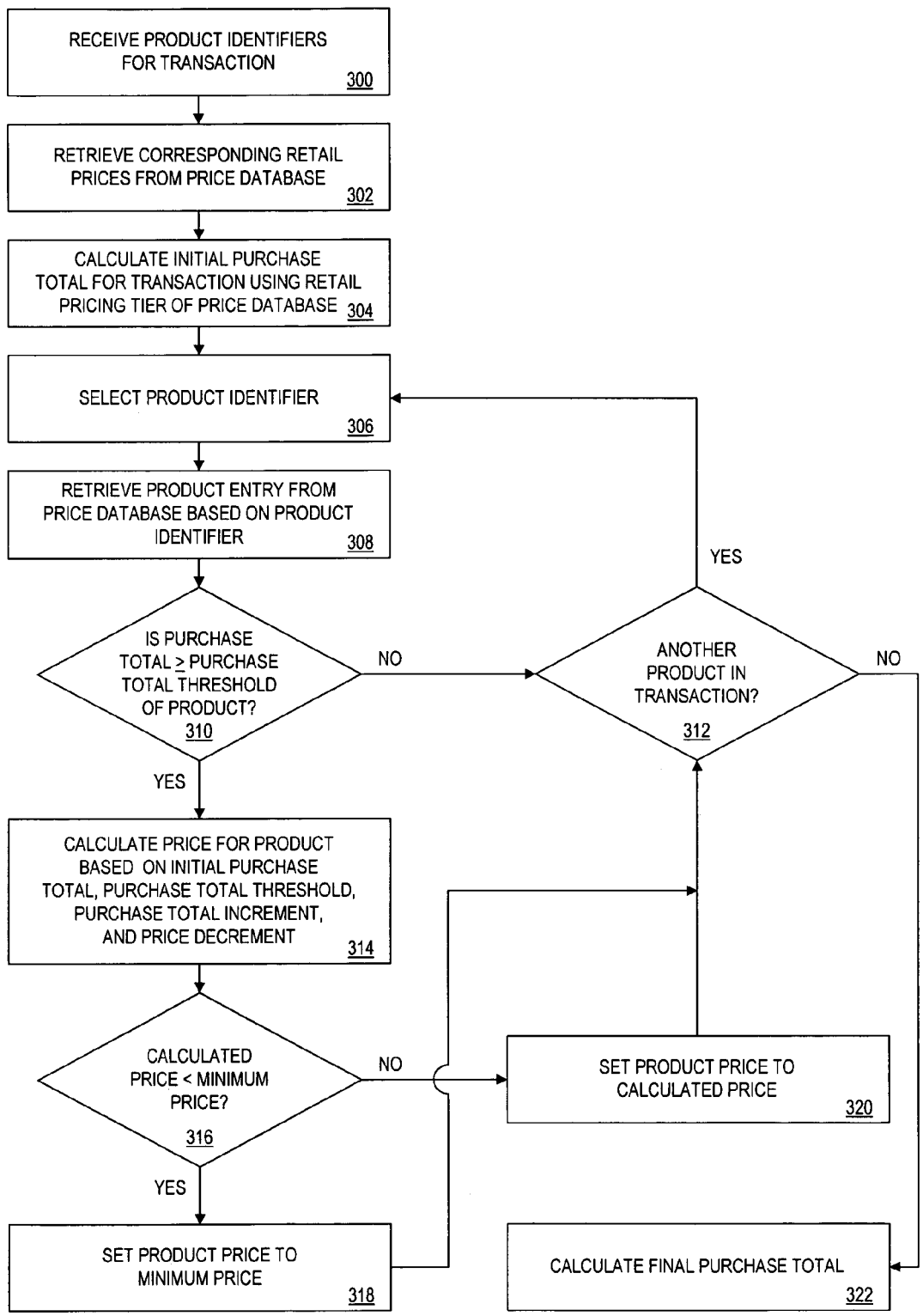
FIG. 14 is a flowchart which illustrates a process carried out according to another alternate embodiment, in which product pricing is calculated on the basis of price decrements and increments in the purchase total of a transaction.

FIG. 14 illustrates a process which corresponds to an embodiment of the invention which utilizes the pricing format illustrated in FIGS. 10A, 10B, and 10C.

The process of FIG. 14 begins with steps 300, 302 and 304, which are essentially the same as steps 120, 122 and 124 of FIG. 12. To recapitulate these steps, product identifiers for each product to be purchased in the transaction are received by the POS terminal (e.g. are input into the POS terminal via a bar code scanner or keyboard by a cashier operating the POS terminal), retail prices for each of the products corresponding to the received product identifiers are retrieved from the price database, and an initial purchase total for the transaction is calculated using the retail prices.

Following step 304, the process of FIG. 14 enters a processing loop which is applied to each product in the transaction. In the first step of the loop, which is step 306, the product identifier corresponding to the next (the first product at the outset of the loop) product to be processed is selected from the products included in the transaction. Specifically, the purchase total threshold, the price decrement, the purchase total increment and the minimum price for the product are all retrieved in step 308 (e.g. from a database such as illustrated in FIG. 10B).

Following step 308 is a decision block 310. In decision block 310, it is determined whether the purchase total for the transaction, as calculated at step 304, is at least equal to the "purchase total threshold" for the currently selected product identifier. If not, the retail price for the product is stored as the price to be applied to the current transaction for the selected product. Then it is determined, at decision block 312, whether or not there are further products to be considered in connection with the transaction. If there are further products in the transaction, the process of FIG. 14 loops back to step 306.

It will next be assumed that, at step 310, it was determined that the initial purchase total calculated at step 304 was at least equal to the "purchase total threshold" for the currently selected product identifier. In that case, step 314 follows decision block 310. In step 314 a discounted price for the product represented by the product identifier is calculated according to the formula set forth below. This discounted price thus replaces the retail price for the product within the current transaction and is determined by the POS terminal to be the appropriate price for the product to be applied to the current transaction. Of course methods other than overriding the retail price may be recognized and utilized by one of ordinary skill in the art in providing a calculated discounted price to the customer in accordance with the invention. For example, the difference between the retail price and the calculated discount price may be determined by the POS terminal and applied to the current transaction as a credit (i.e. deducted from the initial purchase total). An example formula of how to calculate a discount price for a product in accordance with the invention follows:

$$P_D = P_R - \{(1+[(T-H)/I]) \times D\} \qquad (1)$$

where:
- $P_D$=the discounted price to be calculated at step 314;
- $P_R$=the retail price for the product;
- T=the initial purchase total calculated at step 304;
- H=the purchase total threshold for the product;
- I=the purchase total increment for the product;
- D=the price decrement for the product; and
  - the square brackets ([ ]) denote the largest non-negative integer that is less than the quantity within the square brackets.

EXAMPLE A

To present an example of the above calculation, assume that the selected product identifier is "P135" (using the data of FIGS. 10B and 10C for this example) and the initial purchase total (T) calculated at step 304 was $75.32. Then the formula set forth in equation (1) is applied, using the information presented for product P135 in FIGS. 10B and 10C, as follows:

$$\begin{aligned}P_D &= 2.99 - \{(1+[(75.32-50.00)/10.00]) \times 0.05\} \\ &= 2.99 - \{(1+[25.32/10.00]) \times 0.05\} \\ &= 2.99 - \{(1+2) \times 0.05\} \\ &= 2.84\end{aligned}$$

Consequently, in this example the discounted price $P_D$ calculated for the product in step 314 is $2.84.

If the initial purchase total had been between $50.00 and $60.00, the formula of equation (1) would yield a discounted price $P_D$ of $2.94 for the product represented by product identifier P135 (in accordance with the illustrative data of FIGS. 10B and 10C).

Following step 314, the discounted price calculated in that step is compared with the minimum price for the product under consideration, as indicated at decision block 316. If the discounted price is less than the minimum price, then the price to be applied to the product is set to the minimum price, as indicated by step 318. Otherwise the price to be applied to the product is the discounted price calculated at step 314, as is indicated by step 320.

Following either step 318 or step 320, as the case may be, the process advances to decision block 312, at which it is determined whether there is another product in the transaction to be considered. If another product is included in the transaction that has not yet been processed, the process loops back to step 306. Otherwise, the process advances from decision block 312 to step 322, at which a final purchase total to be applied to the transaction is calculated by substituting for the retail price of each product any discounted price for the product that was set according to step 318 or step 320.

It will be noted that the discount technique illustrated in FIGS. 10A-10C and FIG. 14 provides even greater flexibility than the technique exemplified by the process of FIG. 12. In the technique of FIGS. 10A-10C and FIG. 14, there are four separate variables that may be adjusted for each product. These are (i) qualifying threshold ("purchase total threshold"), (ii) price decrement, (iii) purchase total increment, and (iv) minimum price. With these four variables, the retailer has almost complete freedom to adjust the discounting plan according to the retailer's promotional goals, and the profitability of each product. It is contemplated to modify the discounting technique illustrated in FIGS. 10A-10C and FIG. 14 in a number of ways. For example, one or more of the four variables can be made uniform among all of the products. As another variation, the formula applied at step 314 can be changed. The following is an example of a formula that could be applied instead of the formula of equation (1):

$$P_D = P_R - \{[(T-H)/I] \times D\} \qquad (2)$$

If the formula of equation (2) were applied to the Example A given above, the discounted price $P_D$ for the product P135 would be 2.94¢.

In the discounting techniques which have been described up to this point, qualification for discount pricing has depended upon a characteristic of the transaction to which the discount pricing is to be applied. However, the present invention contemplates using other types of criteria to determine qualification for discounting. Such criteria may include a customer's purchasing history or the purchasing history of a group or "team" with which the customer is associated.

If purchasing history is to be used to determine eligibility for discounted prices, then it becomes desirable to maintain a transaction database 90 of the type referred to in connection with FIG. 3. FIG. 15 illustrates an example of a single transaction record 400 which is included in the transaction database 90. The fields included in the transaction record 400 include a transaction identifier 402 (which may comprise, for example, a string of alphanumeric digits that uniquely identify the transaction), a customer identifier 404 (which may comprise for example, a string of alphanumeric digits that uniquely identify the customer or the team that the customer is associated with), an operator identifier 406 which identifies the check-out clerk who handled the transaction, and a POS identifier 408 which identifies the POS terminal 52 at which the transaction was processed. Additional fields in the transaction record 400 include the purchase total for the transaction (field 410) and a field 412 which indicates the date and time at which the transaction occurred. The balance of the transaction record 400 is made up of data entries 413 which identify the products purchased and the price paid therefor. It is seen from FIG. 15 that each entry has a data element in a product identifier column 414 and another data element in a price paid column 416.

Another component for a purchase-history-based discounting plan is the customer database component 92 shown in FIG. 3. FIG. 16A illustrates one simplified example of such a customer database. FIG. 16A indicates that the customer database 92 is made up of data entries 500, each of which includes a respective data product in three columns, namely a customer identifying code 502, customer name 504 and a column 506 which contains an indication of a discount pricing tier for which the customer has qualified. The manner in which a customer qualifies for a discount pricing tier may be determined in a number of ways. For example, qualification for a particular discount pricing tier may be based on the sum of purchase totals spent by the customer during the previous calendar month. According to one example, customers whose sum of purchase totals is equal to or greater than $100 in the preceding calendar month would be eligible for the gold discount tier. Customers who purchased at least $75 during that period of time but less than $100 would qualify for the silver tier, and those who purchased at least $50 but less than $75 during that time period would qualify for the bronze tier. Customers who purchased less than $50 during the qualifying period would pay the retail prices for the products purchased.

It should be understood that the qualifying period may be set to be shorter or longer than a month, that the qualifying amounts referred to above can be varied in many ways, and that the time period need not be tied to a calendar month or week, but could be rolling from day to day so that, for example, the customer's qualification to receive discounted prices on a given day may depend on the quantity of purchases that he or she made in the last 30 days, the last 7 days, or any other period of time. The present invention also contemplates that, instead of basing discount qualification on the sum of purchase totals for a period of time, the qualification could be based on the average value per transaction during a given period. If a "rolling" qualification period is used, the current transaction itself could be used to update the customer's purchasing history and to therefore grant or withhold qualification for a particular discount pricing tier on the basis of the current transaction taken into consideration with previous transactions. Additional methods of updating and applying a discount that a customer qualifies for based on their purchasing history is disclosed in applicant's co-pending U.S. patent application entitled "METHOD AND APPARATUS FOR DETERMINING A PROGRESSIVE DISCOUNT FOR A CUSTOMER BASED ON THE FREQUENCY OF THE CUSTOMER'S TRANSACTIONS", U.S. application Ser. No. 09/166,267, filed Oct. 5, 1998, which is incorporated by reference herein as part of the present disclosure. U.S. application Ser. No. 09/166,267 discloses, for example, conditions associated with a customer rating that corresponds to a discount that have to be satisfied, in order for the customer to qualify for the discount. U.S. application Ser. No. 09/166,267 further discloses methods of updating a discount that a customer is entitled to based on their previous transactions (i) at the time of a transaction, or (ii) periodically; and methods of updating a discount that a customer is entitled to based on the products included in the customer's transaction.

Figure 16B:
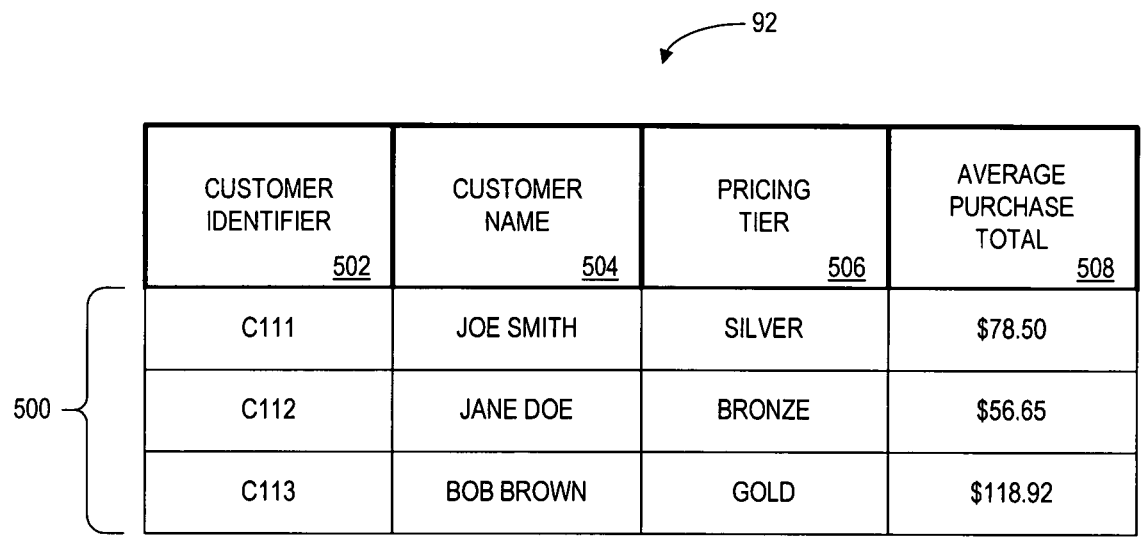
FIG. 16B illustrates another example of a customer database stored according to an alternate embodiment of the invention.

FIG. 16B presents an alternate format for a customer database 92. This format includes an additional column 508 in which some details of the customer's purchasing history are presented. In the example shown in FIG. 16B, an entry for "average monthly purchase total" is shown in column 508. This figure could represent, for example, the monthly average of purchases by the customer during the most recent three calendar months.

As noted above, the discount pricing tier for which a customer qualifies may be determined on the basis of a purchasing history of a "team" (e.g. a group of customers) to which the customer belongs. To implement this type of discounting plan, a team database 94 (FIG. 3) should also be maintained in addition to a customer database 92. FIGS. 17A and 17B respectively present simplified examples of formats for a team database 94 and a customer database 92 to be used in connection with a team shopping plan.

In the team database 94 shown in FIG. 17A, data products 520 each have two attributes, of which the first, corresponding to column 522, is an identifier for the team, and the second, corresponding to column 524, is the discount level for which the team qualifies. A method and apparatus for managing a group reward program whereby a group of customers is registered with a retail outlet as a shopping group is disclosed in applicant's co-pending U.S. patent application entitled "POINT-OF-SALE SYSTEM AND METHOD FOR THE MANAGEMENT OF GROUP REWARDS", U.S. application Ser. No. 09/118,414, filed Jul. 17, 1998, which is incorporated by reference herein as part of the present disclosure. U.S. application Ser. No. 09/118,414 discloses a system that uses point-of-sale terminals to monitor transactions processed according to a group reward program, wherein the system (i) stores a plurality of customer identifiers that correspond to customers that register with the group reward program; (ii) assigns a group identifier to the group of customers; (iii) stores and applies reward rules that apply to the groups; (iv) tracks the performance of the group as compared to the reward rules; (v) determines whether the group is eligible for a reward (e.g. by performing a periodic reconciliation process for each stored group identifier; and (vi) performs a redemption process of any rewards the group is eligible for. Examples of reward rules include a number of purchases to be made by a group, a dollar value of purchases to be made by a group, a number of purchases to be made by the group within a predetermined period of time or before a predetermined date, specific products to be purchased by the group, and a specific time or times during which purchases must be made by the group.

The customer database format shown in FIG. 17B is similar to that shown in FIG. 16A. In FIG. 17B the "pricing tier" column 506 of FIG. 16A is replaced with a column 510 which consist of team identifying codes to indicate the team to which the customer belongs. It will be recognized that the data contained in the databases of FIGS. 17A and 17B can be processed to determine for each customer the discount pricing tier for which the customer qualifies.

Figure 18:
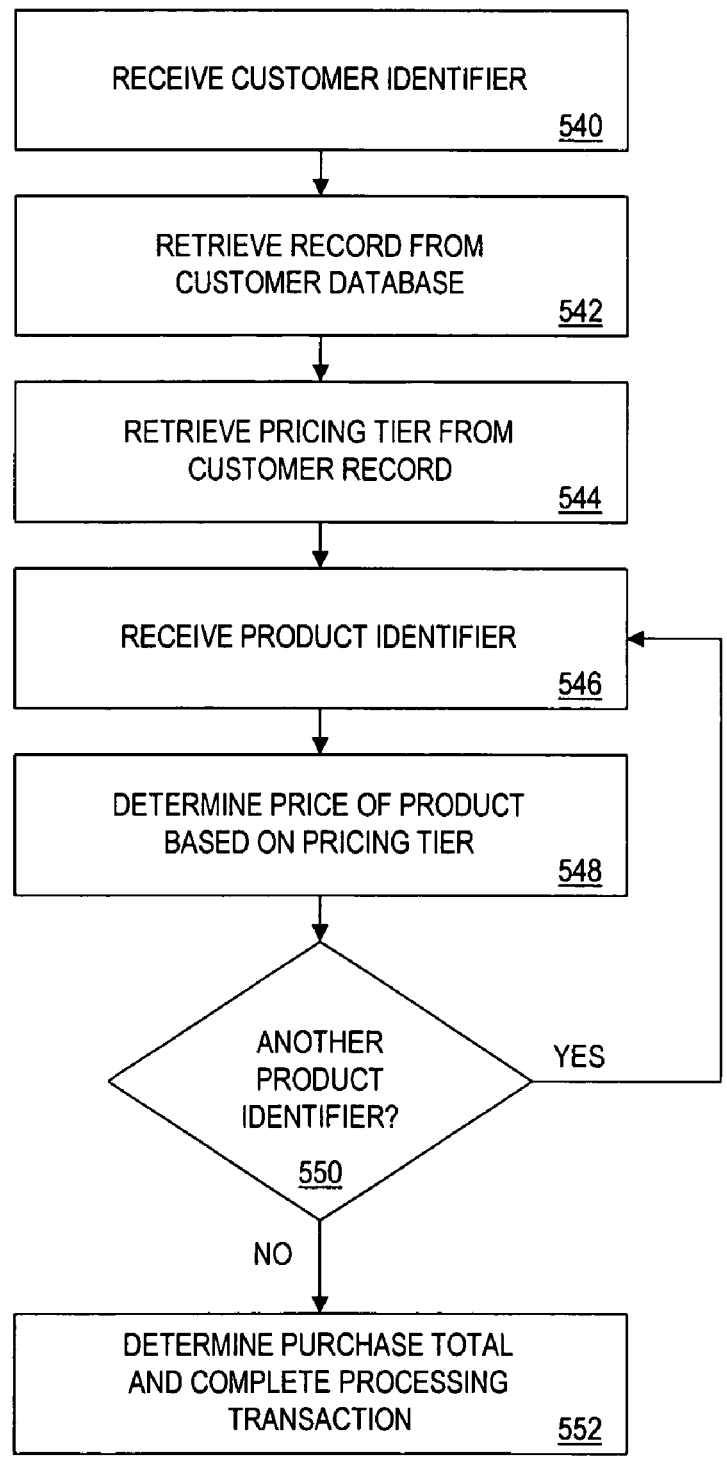
FIG. 18 is a flowchart which illustrates a process for calculating purchase totals in a multi-tier product pricing system which is based on a customer's purchasing history, as provided according to another alternate embodiment of the invention.

FIG. 18 is a flowchart which illustrates a process carried out according to an embodiment of the invention in which customers qualify for discounted pricing based on their purchasing history. According to the process shown in FIG. 18, the POS terminal begins processing a transaction by first receiving data which identifies the customer (step 540). For example, customers participating in the discount plan may carry an identification card which includes a magnetic stripe or a bar code to indicate the customer's identification code. In such cases, step 540 can be carried out by using a bar code reader or a magnetic stripe reader to read the customer's identification card. As an alternative, the identification card may simply have printed thereon an ID code or the customer's name, and the ID code or customer's name can then be entered into the POS terminal by using the keyboard. The customer could also carry a "smart card" from which the POS terminal reads identifying information by wireless communication.

Once the customer identifier has been entered, step 542 follows, in which the POS terminal retrieves from the server 54 the corresponding record for the customer which is maintained in the customer database 92. Next, at step 544, the POS terminal 52 and/or the server 54 extracts from the customer record the data in column 506 for that customer, namely data which indicates the pricing tier for which the customer is qualified.

The process of FIG. 18 then continues with a loop consisting of steps 546 and 548 and a decision block 550. In this processing loop, the products to be purchased in the transaction are processed in a serial fashion. At step 546 the product identifier is entered by, for example, using a bar code reader to read a bar code on the product. Then, at step 548, the corresponding price for the product, in the pricing tier for which the customer is qualified, is retrieved.

At decision block 550 it is determined whether another product is to be included in the transaction. If so, the process loops back to step 546. Otherwise, step 552 follows decision block 550. At step 552, the prices determined for the products presented for purchase are totaled and other steps required to complete the transaction are carried out.

To summarize the process illustrated in FIG. 18, the customer is identified at the beginning of the transaction, his or her qualification for discount pricing is determined, and then each product purchased in the transaction is priced according to the pricing tier for which the customer is qualified.

Figure 19:
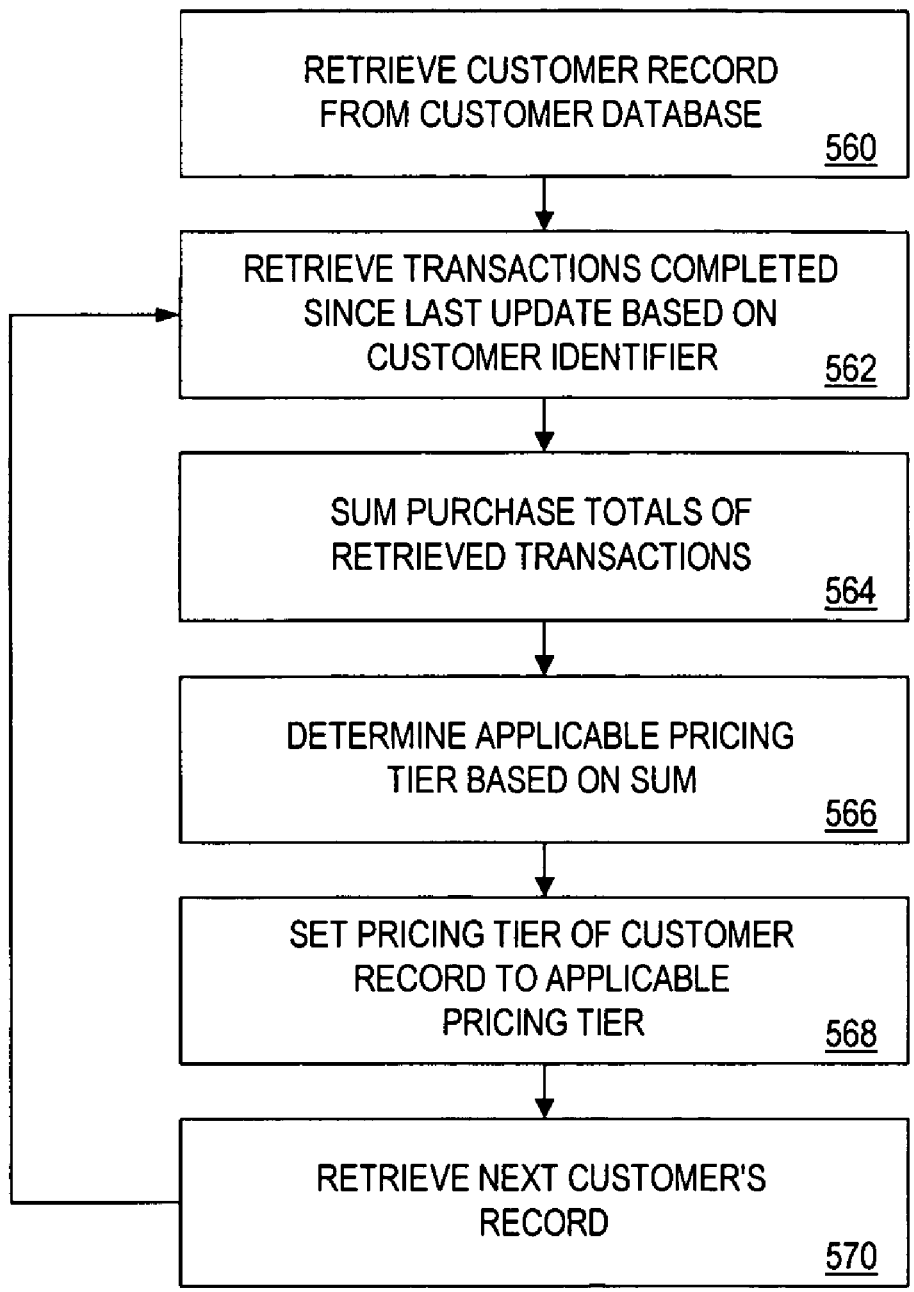
FIG. 19 is a flowchart which illustrates a process, provided in accordance with an alternate embodiment of the invention, for updating customers' purchasing histories.

FIG. 19 illustrates a process carried out in accordance with the invention to update a customer's purchasing history. For example, the process of FIG. 19 might be carried out as a batch process at the end of each week or month, depending on how the discount plan operates. The process is preferably performed by the central server 54 (FIG. 3) or by another server (not shown) in communication with the central server 54.

Let it be assumed for the purposes of this example that the discount plan is based on the sum of purchase totals completed by the subject customer during, for example, a calendar month. In that case, at the end of each month, the process of FIG. 19 would be carried out.

According to a first step (reference numeral 560) in FIG. 19, a customer record (i.e., one of the data entries 500 shown in FIG. 16A) is retrieved from the customer database 92 by the central server 54. The central server 54 then retrieves from the transaction database 90 all transaction records 400 (FIG. 15) for the customer which have a date since the most recent updating of the customer database. In particular, the central server 54 extracts from the customer records the purchase totals (product 410) for each of the transactions.

Referring once more to FIG. 19, the purchase totals for the retrieved transactions are added together to establish the total amount spent by the customer during the relevant period. Then, as indicated at step 566, it is determined on the basis of the total amount spent during the period, what discount pricing tier the customer is qualified for. On the basis of this determination, the "pricing tier" entry for the customer in the customer database 92 is updated at step 568 by writing the appropriate indication into column 506 (see FIG. 16A). The central server 54 then retrieves the next customer's record from the customer database 92 (step 570) and the loop which commences with step 562 is repeated.

As an alternative to the batch-processing approach illustrated in FIG. 19, the invention also contemplates that the customer database can be updated in essentially "real time", i.e., each time a transaction takes place. A process which illustrates this alternative will now be described with reference to FIG. 20. The customer is identified at the beginning of the transaction when the customer identifier is received by the POS terminal in step 580. The customer's record is retrieved from the customer database based on the retrieved customer identifier and the pricing tier for which the customer is qualified is retrieved from that record in step 582. The product identifiers of the products included in the present invention are received in step 584. In step 586 the appropriate prices for the received product identifiers are retrieved from the pricing database based on the pricing tier determined in step 582, these prices are summed to determine the purchase total for the current transaction.

Figure 20:
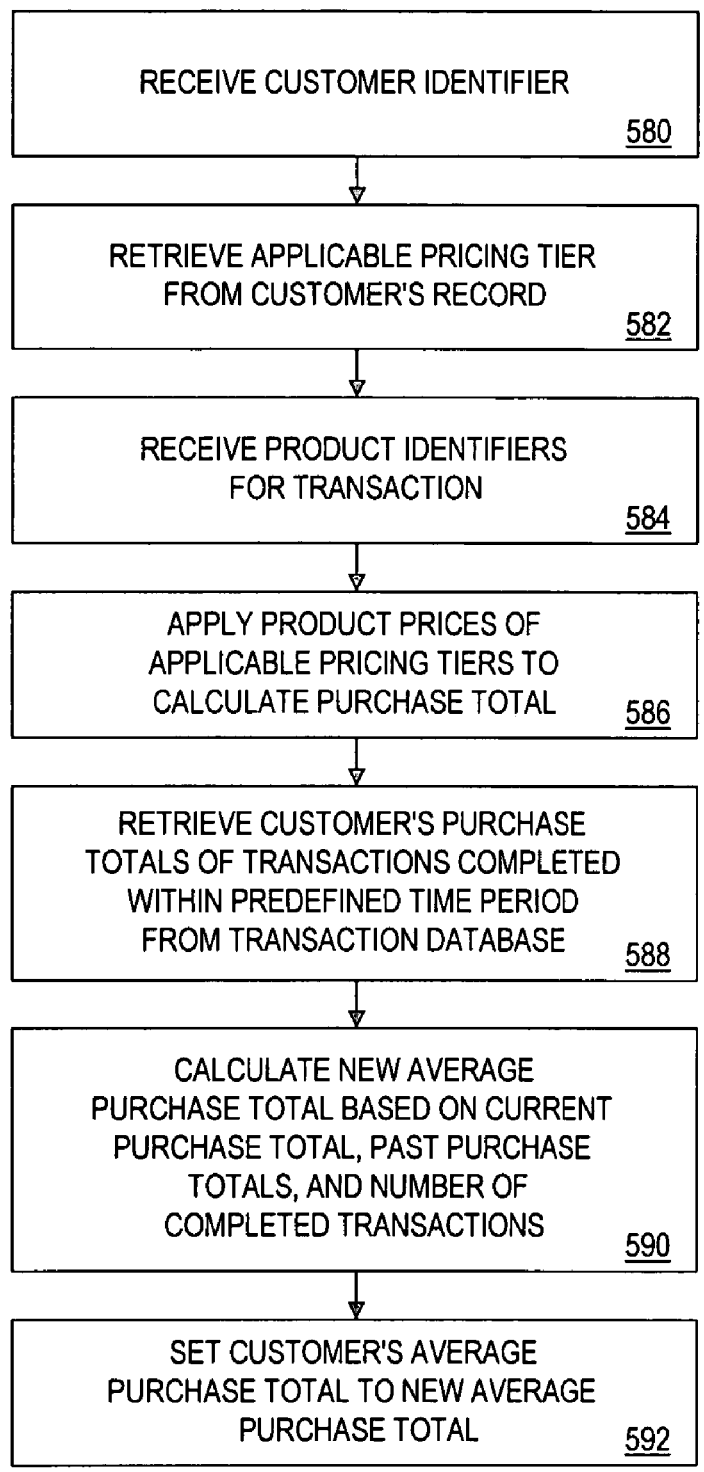
FIG. 20 is a flowchart which illustrates a process, provided according to another embodiment of the invention, which includes both calculating purchase totals according to a customer's purchasing history, and updating the customer's purchasing history.

For the purposes of the process illustrated in FIG. 20, it is assumed that discount pricing tier qualification is based upon a customer's average purchase level during a predetermined period of time, such as the last month. The last three steps of FIG. 20 indicate how the average purchase figure is updated based on the current transaction. In step 588 the purchase totals of the customer's previous transactions in the relevant time period are retrieved from the customer's record of the transaction database (based on the customer identifier). At step 590, the average purchase total stored in the customer's record (for example, as represented by field 508 in table 92 of FIG. 16B) of the customer database is updated by summing the purchase totals of the transactions retrieved in step 588 and the current transaction, and then dividing by the number of transactions. The average purchase total is stored in the customer's record of the customer database and the discount pricing tier for which the customer is qualified is determined on the basis of the updated average purchase total and stored in the customer's record of the customer database in step 592. The process of updating the customer's average purchase total has been described as being initiated upon the completion of a current transaction by the customer. It will be understood by those skilled in the art that such an update of the average purchase total can be performed via different methods, such as on a periodic basis (e.g. once a week). The process of updating a customer's average purchase total may also be completed in a batch process such that all or some of the customer's records are processed essentially at the same time. It should also be understood that if the average purchase total is calculated for a predetermined length or period of time (e.g. monthly) then at the end of such a period of time the average purchase total would be reset to a default value (e.g. zero) and the process started again for the new period (e.g. the next month). When the average purchase total is reset, the discount pricing tier that the customer is qualified for may be set to (i) the same discount pricing tier that the customer had been qualified for at the end of the previous period of time, (ii) rest to a default discount pricing tier, or (iii) set to the retail pricing tier.

Figure 21:
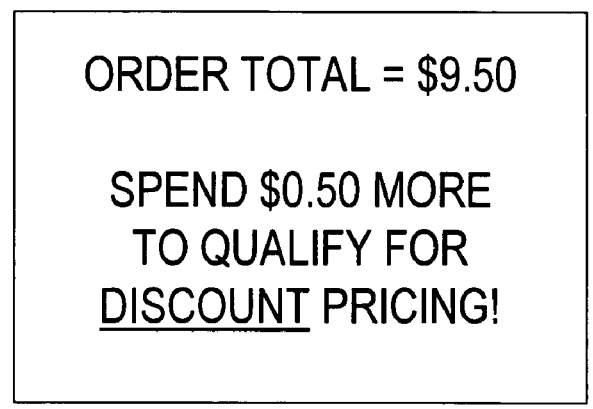
FIG. 21 illustrates information which may be displayed on a display screen of a point of sale terminal in a quick service restaurant to advise the customer how to qualify for a discount pricing tier.

Up to this point, embodiments of the invention have mainly been described in the context of a physical retail outlet (e.g. a supermarket). However, the practices of the present invention are also applicable to a number of other types of retail outlets. For example, the teachings of the present invention could be advantageously applied in the environment of a quick service restaurant; e.g., with the goal of increasing the average purchase per visit. According to one example, an operator of a quick service restaurant may choose to define only a single discount tier of prices, thereby assigning only a retail price and a discounted price to each product. The quick service restaurant operator may set a fairly low threshold purchase total for a transaction, say $10, for the discount pricing to apply. In such a case, the operator of the quick service restaurant might also find it advantageous to display at the POS terminals the amount of an additional purchase that the customer needs to make in order to qualify for discount pricing. In this example, assume that the purchase total threshold to qualify for discount pricing is $10, and that the customer has ordered a number of products whose retail prices sum up to a purchase total $9.50. The POS terminal can be programmed to display information such as that shown in FIG. 21 to indicate that the customer needs to spend another $0.50 to qualify for discount pricing. The POS terminal could further be programmed to determine an appropriate product to suggest to the customer and display the suggestion for the product in the form of a prompt to the cashier operating the POS terminal. The cashier operating the POS terminal could therefore suggest to the customer an additional product that could be purchased to reach the discount pricing based on the displayed prompt.

The present invention also contemplates application of the multi-tier product pricing techniques disclosed above to retail outlets other than retail stores. One type of retail outlet for which the practices of the present invention may be particularly advantageous is an Internet shopping sites. A particular application of the present invention to an Internet shopping site (which will be referred to as a Web site herein) will now be described with reference to FIGS. 22-25.

Figure 22:
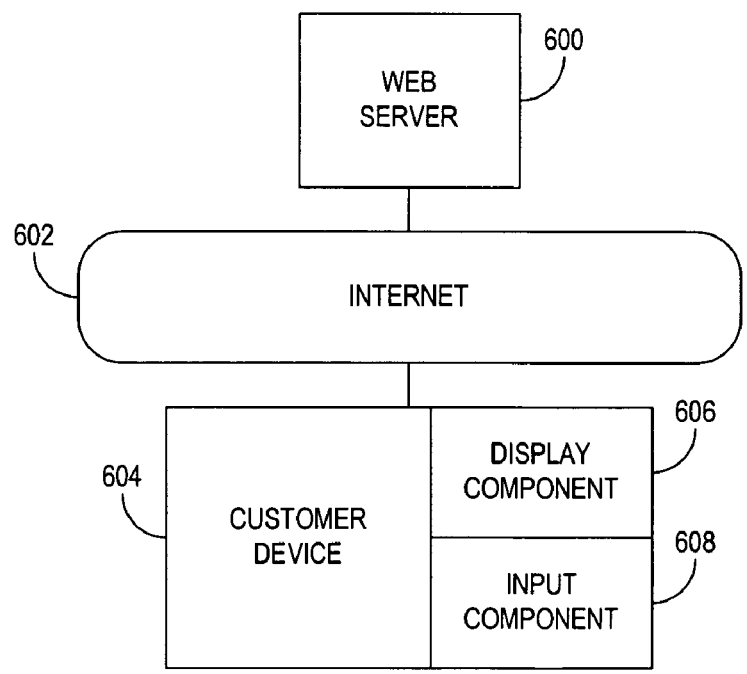
FIG. 22 schematically illustrates an arrangement of equipment that may be employed for shopping over the Internet, and in which an alternate embodiment of the invention is applied.

FIG. 22 is a highly schematic representation of the computer hardware needed to carry out this aspect of the invention. All of this hardware may be of conventional design. The hardware includes a Web server computer 600, which is connected to the Internet (represented by reference numeral 602) and is programmed to host a Web site. In addition, the Web server 600 is programmed to perform functions in accordance with the present invention, as will be described below. It is also contemplated that the Web server 600 would maintain a product and price database. Of course, it is possible that the products available for purchase through the Web server 600 are different from the grocery products listed in the examples referred to above. The products available for sale through the Web server 600 may be books, musical recordings, videos, clothing, computers and computer peripherals, services such as carpet cleaning, or any other type of product.

FIG. 22 also shows a customer device 604 connected to the Internet 602. The customer device may be any device that allows the customer to access the Web server via the Internet, such as a personal computer (PC), personal digital assistant (PDA), cellular phone, or pager. As will be understood by those who are familiar with operation of the Internet, the customer device 604, when connected via the Internet 602 to the Web server 600, operates in a "client" mode to exchange data with the Web server 600. Accordingly, the customer device 604 will sometimes be referred to as a "client computer". Although only one customer device 604 is shown as being in communication with the Internet 602, it will be understood that any number of customer devices may be connected to the Internet and access the Web server 600. In addition, the Web server 600 is likely to be arranged to serve a number of customer devices 604 simultaneously so that more than one customer may place orders with the Web server 600 at any given time.

Few details of the customer device 604 are shown in FIG. 22, but it is to be appreciated that in most cases the customer device 604 will have all of the components usually found in a computer (e.g. processor, display component, input component, device drivers, communication port). For present purposes, only a display component 606 and an input component 608 (e.g. a keyboard and/or mouse are shown. The customer device 604 may also take the form of a so-called Web-access "appliance", i.e., a device which can be attached to a television set to enable a viewer to navigate the Internet and to display downloaded information on the television screen.

Figure 23:
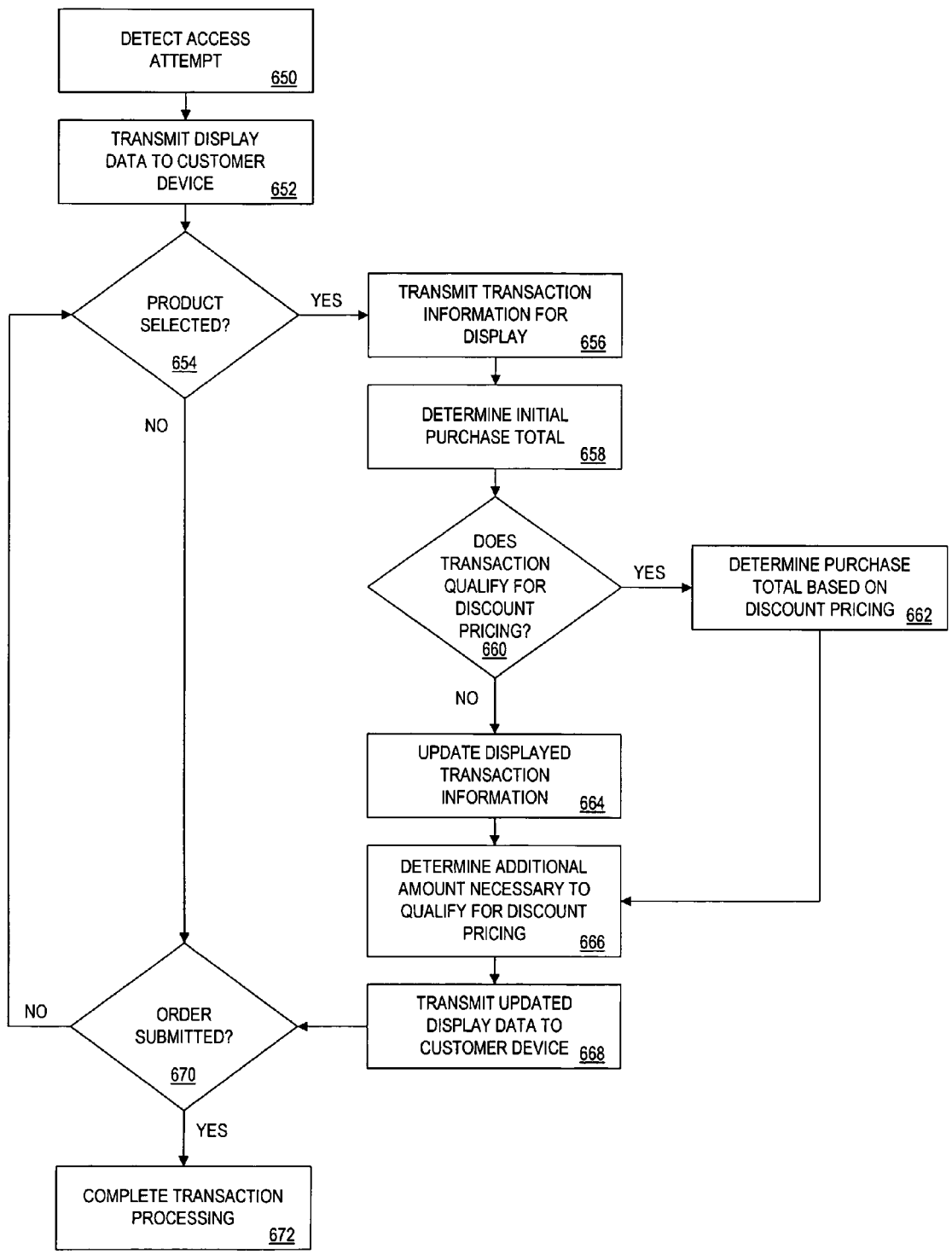
FIG. 23 is a flowchart which illustrates a process carried out in accordance with the invention in which a customer who is shopping via the Internet is provided with information concerning how to qualify for discount product pricing.

FIG. 23 is a flowchart which illustrates an example of a process performed by the Web server 600 in accordance with an embodiment of the invention. In the example illustrated by FIG. 23, it will be assumed that the Web server 600 is hosting a Web site for selling bicycling accessories, and that the Web server stores a price database with only two discount pricing tiers—retail prices and one tier of discount prices.

It should be noted that although the following processes are described as being performed by the Web server 600, the processes may alternately be performed by one or more servers that are in communication with the Web server 600 or by a combination of the Web server 600 and one or more additional servers.

According to an initial step 650 in FIG. 23, the Web server 600 receives an attempt by the customer device 604 to access the shopping Web site hosted by the Web server 600. As is known to those who are skilled in the art of the Internet, including users thereof, a customer may perform the access attempt using the customer device 604 by entering the Web address for the server 600 into the appropriate field of their browser, or by selecting a hyper-link for the shopping Web site.

When the Web server 600 detects the access attempt from the customer device 604, the Web server 600, in step 652, transmits to the customer device 604, via the Internet, information to be displayed on the customer device 604. One of the purposes of the information is to permit the user of the customer device 604 to perform a shopping function. An example of the resulting screen display that may be provided on the display component 606 of the customer device 604 is shown in FIG. 24.

Figure 24:
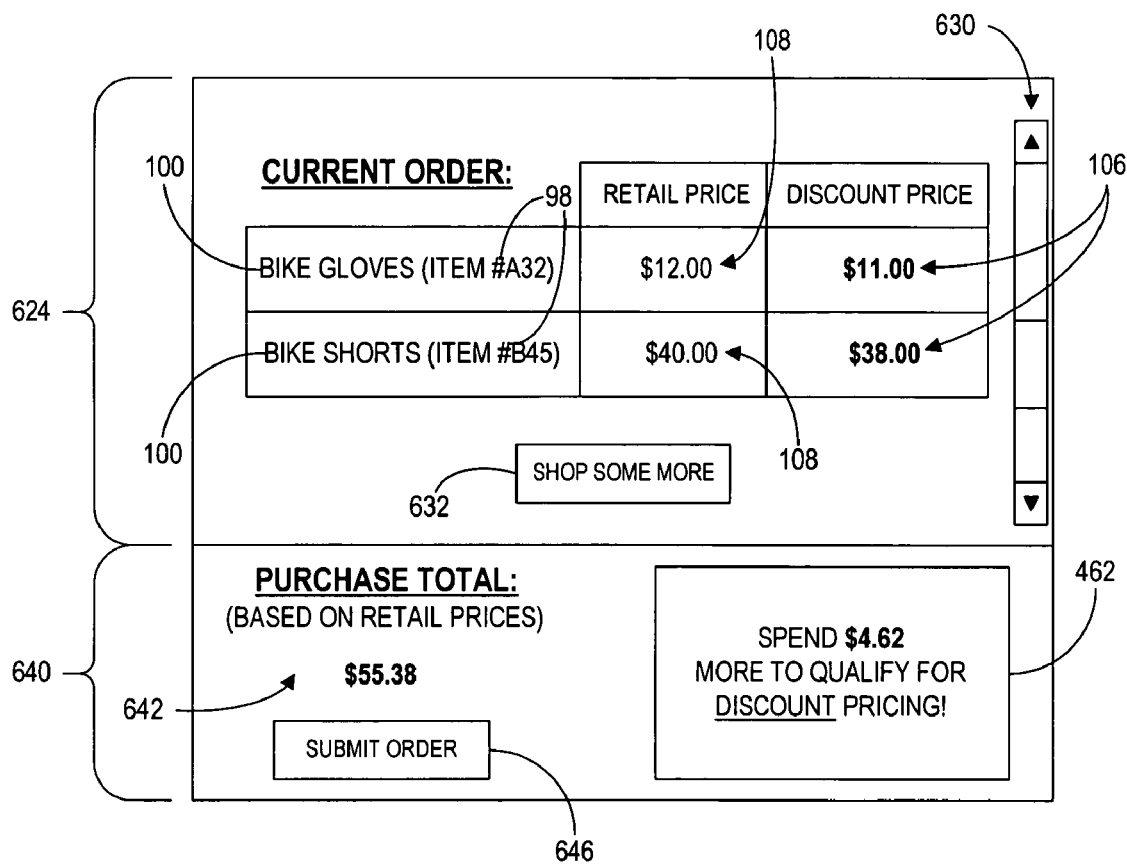
FIG. 24 is an illustration of a display provided to the customer in accordance with the process of FIG. 19.

Referring now to FIG. 24, except for the discount qualification information which will be described below, the screen display shown in FIG. 24 may resemble conventional screen displays provided in response to accessing a shopping Web site. The screen display of FIG. 24 includes an upper display section of the screen 624 which includes product listings 626 and 628. The product listings 626 and 628 display information on the products currently included in the customer's order. At the right-hand side of the upper display section 624 a scroll bar 630 is provided to permit the customer to scroll upward or downward to view additional product listings or other information displayed on the screen. Each of the product listings includes a product description 100, a product identifier 98, a retail price 108 and a discounted price 106. Those of ordinary skill in the art will recognize how the product listing portions 626 and 628 of the screen display of FIG. 24 can be generated from corresponding data entries in the price database referred to above.

Also included in the display section 624 is a "shop some more" button 632 which may be actuated by the customer using a cursor (not shown) to indicate that the customer wishes to continue shopping (i.e. add more products to his order). Although not shown in FIG. 24, it will be understood that images and additional description of the products may also be included in the display. Although only two product listings are shown in FIG. 24, it will be understood that the format of the screen display may be modified so that a larger number of product listings are displayed at a given time.

The screen display of FIG. 24 also includes a lower display section 640 which includes a purchase total field 642 and a discount qualification notice 644. The purchase total field 642 indicates the total dollar amount of products that the customer has ordered during the session. FIG. 24 displays a purchase total of $55.38 (the sum of the retail price of the products included in the customer's order plus an exemplary 6.5% sales tax).

The discount qualification notice 644 indicates to the customer the dollar amount of additional purchases that the customer needs to make in order to qualify for discount pricing. For the purposes of this example, it is assumed that the purchase total required for discounted pricing is $60.00. Accordingly, the customer is informed via the discount qualification notice 644 that he or she needs to spend an additional $4.62 ($60.00−$55.38=$4.62) to qualify for discount pricing.

The lower display section 640 of the display also includes a "submit order" button 646 that the customer may actuate to indicate that he or she has completed selection of the products to be ordered and, for example, is ready to provide payment information to the Web server 600.

Referring again to FIG. 23, a decision block 654 follows step 652. At decision block 654 it is determined whether a product has been selected for purchase by the customer operating the customer device 604. If so, the transaction information for the current transaction is transmitted for display by the customer device 604 in step 656. Displaying the transaction information may comprise, for example, retrieving the product identifier corresponding to the selected product from the product database and entering it into the product identifier field 98 of the display illustrated in FIG. 24 as well as adding a product listing such as the product listings 626 and 628 in FIG. 24 to the upper display section 624 (FIG. 20). As described above, the product listing may include the selected product description, the retail price of the product, and the discount price of the product.

At step 658, the Web server 600 then generates an initial purchase total for the transaction based on the retail price for the product and any sales tax applicable. The process then continues to decision block 660, in which step the Web server 600 determines whether the transaction qualifies for discount pricing (e.g. it is determined whether the initial purchase total is at least equal to a threshold purchase total). If the transaction does qualify for discount pricing, the process proceeds to step 662, wherein a purchase total is calculated for the transaction using the discount price for the product included in the transaction. Once the purchase total using the discount price is calculated, the displayed transaction information is updated in step 664 using the purchase total calculated in step 662. For example, the purchase total calculated in step 662 is entered into the purchase total field 642 of the lower display section 640 (FIG. 24). In addition, the discount qualification notice 644 may be updated to include a notice such as "Congratulations! You have qualified for discount pricing! The order total reflects the discount prices for the products you have ordered."

If, in decision block 660, it is determined that the initial purchase total does not qualify for discount pricing, the process continues to step 666. In step 666 the additional amount that the customer needs to spend in order to qualify for discount pricing is determined. The additional amount that the customer needs to spend may be determined, for example, by subtracting the purchase total from the threshold purchase total associated with discount pricing.

The process then continues to step 664, wherein the displayed transaction information is updated. Updating the displayed transaction information in this case may comprise displaying the initial purchase total in the purchase total field 642 and displaying the additional amount determined in step 666 in the discount qualification notice 644 of the lower display section 640 (FIG. 24). The process continues from step 668 to step 670.

In step 670 it is determined whether the order has been submitted (e.g. it is determined whether the customer has indicated that he or she is finished with the transaction by actuating the "submit order" button 646). If the customer has submitted the current order the process continues to step 672, wherein the transaction processing is completed. Completing the transaction processing may comprise steps such as receiving a payment identifier and shipping address from the customer and submitting the order for shipping to the customer. If, in decision block 670, it is determined that the customer has not submitted the order (e.g. the customer has actuated the "shop some more" button 632 on the upper display section 624 of FIG. 24) the process loops back to step 654 and it is determined whether another product has been selected by the customer and added to the current transaction. If there is another product selected by the customer, steps 656 through 670 are repeated to take into account the newly added product (e.g. an initial purchase total is calculated based on the retail price of the previously selected product and the newly selected product) in addition to the previously selected product. It will also be understood that if a transaction qualifies for discount pricing based on a current purchase total, discount pricing will be applied to all subsequent products added to the transaction.

Although the process of FIG. 23 was described with the assumption that there was only one discount pricing tier available, it is understood that a number of discount pricing tiers other than one may be provided. If multiple discount pricing tiers are utilized the process of FIG. 23 may be slightly adjusted. For example, rather than determining whether the initial purchase total qualifies for a discount pricing, step 660 may comprise determining whether the initial purchase total qualifies for any of the available discount tiers and, if so, which one. Additionally, multiple discount pricing tiers of discount prices can be stored in the price database, and displayed as part of the product listings 626 and 628. In addition, the discount qualification notice 644 would be augmented to indicate the various dollar amounts required to qualify for respective discount pricing tiers.

Furthermore, although the Internet shopping example described above calls for qualification for discount pricing based on the total amount ordered in the transaction, it should be understood that the purchasing history discounting approaches described above in the retail store context can be adapted for use in an Internet shopping context. It is also contemplated to base the discount pricing for the shopping Web site on the number and of qualifying products purchased, as in the embodiment of FIG. 6C.

The embodiments of the invention portrayed in FIGS. 22-25 are particularly attractive to a retailer which operates a shopping Web site, because the discount qualification notice 644 in FIG. 24 is a constant encouragement to the customer to keep the order transaction open and to order additional products in order to reach the threshold purchase total in order to qualify for discount pricing. As a result, the discounting approach of this invention can help the retailer to increase the average size of the orders received through the shopping Web site while maintaining margins that are typically sacrificed in prior art bulk discount programs.

Figure 25:
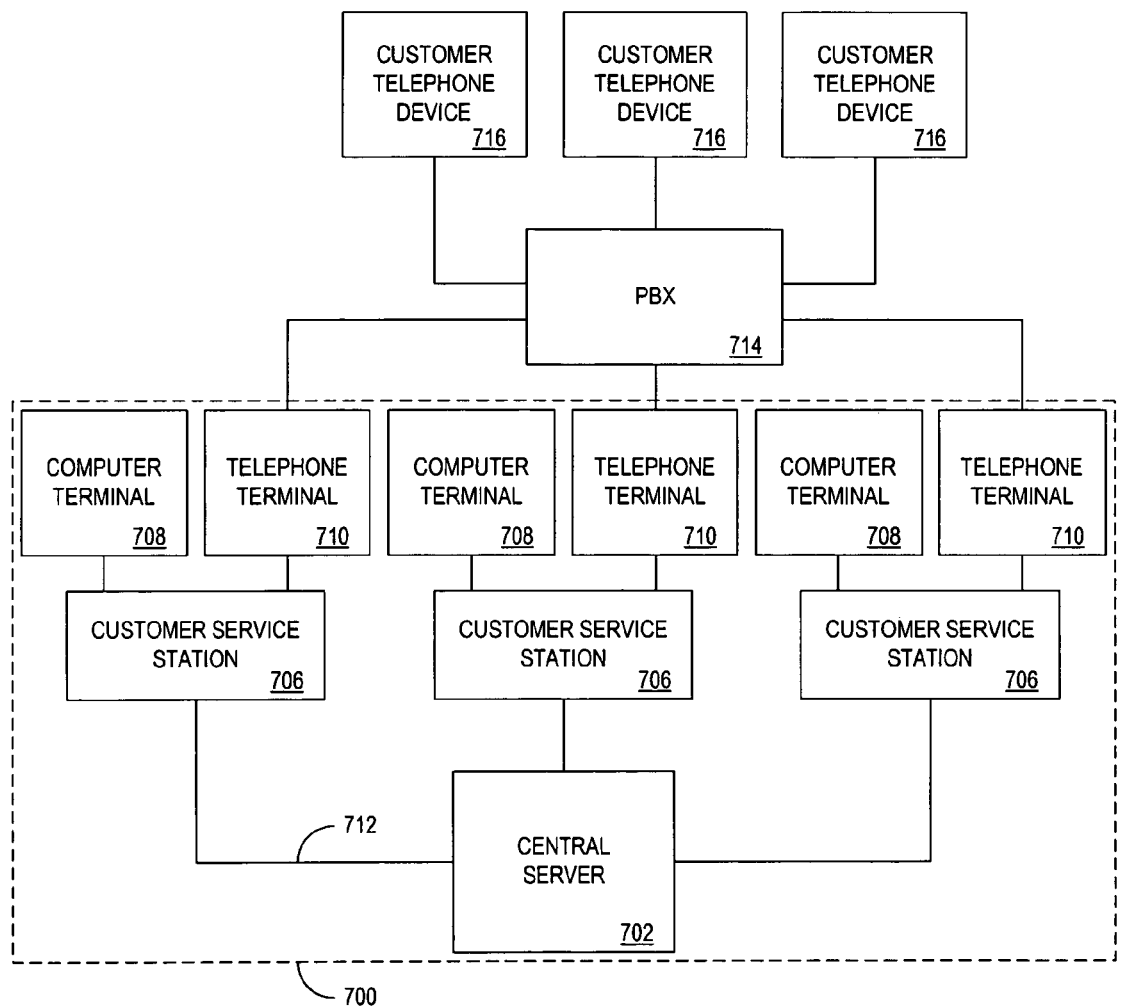
FIG. 25 is a schematic illustration of a catalog order-taking facility in which an embodiment of the present application is applied.
Figure 26:
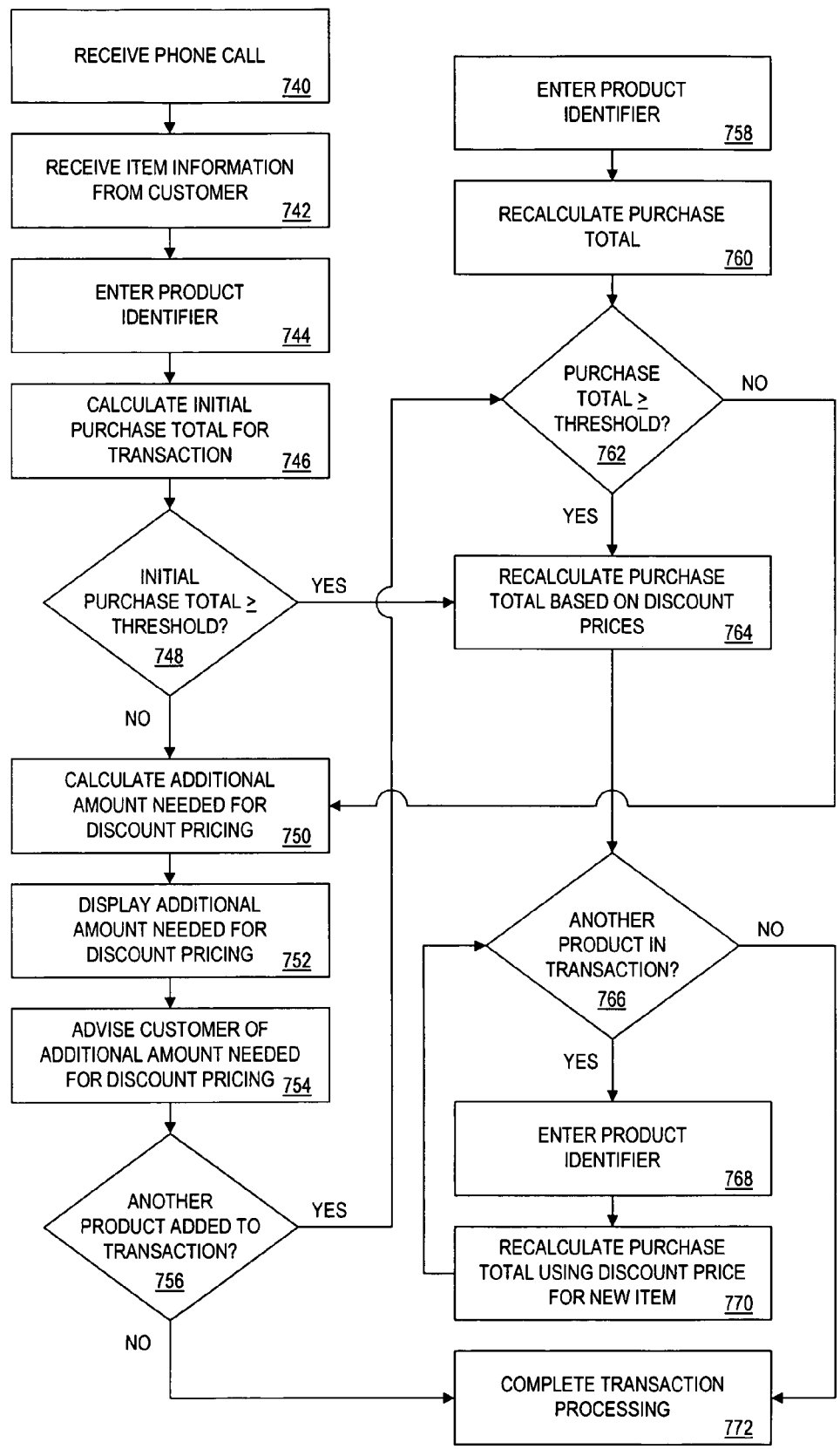
FIG. 26 is a flowchart which illustrates a process by which an embodiment of the present invention is applied in the catalog-order-taking facility of FIG. 21.

The product discounting techniques of the present invention can also be applied advantageously in the context of a telephone-order catalog operation. FIGS. 25 and 26 illustrate an application of the invention in this environment.

FIG. 25 schematically illustrates a catalog order-taking facility 700 that is in communication with customer telephone devices 716 via a public switched network 714. The facility 700 includes a central server 702. The central server 702 may store a program and a database (not shown) that preferably includes at least the price database 86 and the condition database 88 referred to above in connection with FIG. 3.

The facility 700 also includes a number of customer service stations 706. At each station 706 there is provided a computer terminal 708 (or another type of equipment that allows customer service personnel to access product information stored at the central server 702) and a telephone terminal 710 (or another type of equipment that allows customer service personnel to communicate with customers regarding their orders). The computer terminals 708 are connected to the server 702 by a data network 712.

The telephone terminals 710 may comprise a "handset" telephone or a headset device to be worn by the customer service personnel who work at the customer service stations 706. The telephone terminals 710 are connected to the public switched telephone network 714 to receive telephone calls initiated from customer telephone devices 716. In accordance with conventional practice, customers may initiate communication with the catalog order-taking facility 700 by dialing a toll-free number.

For the purposes of this example, it will be assumed that the operator of the facility 700 has printed and distributed catalogs advertising the products to be sold through the facility. Preferably the catalog lists for each product to be sold both a retail price and at least one additional price which corresponds to a discount pricing tier.

FIG. 26 is a flowchart which illustrates a process carried but at the order-taking facility 700 to process an order for products placed by a customer via a telephone call (e.g. communications are exchanged between the customer service representative and the customer via the telephone terminal 710 and a customer telephone terminal 716). Although the example provided in FIG. 26 contemplates only one discount pricing tier, it will be evident that the process of FIG. 26 can be adapted to accommodate two or more discount pricing tiers.

In an initial step 740 shown in FIG. 26, a telephone call from a customer operating a customer telephone device 716 is received by the order-taking facility 700. The customer service representative operating a customer service station 706 exchanges communications with the customer via the telephone connection and is informed by the customer of a product which the customer wishes to order (step 742). The customer service representative then enters a product identifier for the product by a conventional activity such as entering data via a keyboard (not shown) of the computer terminal 708 or selecting a product displayed on the monitor (not shown) of the computer terminal 708 (step 744). The computer terminal 708 or the central server 702 then calculates, in step 746, an initial purchase total for the order transaction on the basis of a retail price for the product. Once the initial purchase total is calculated, it is determined whether the initial purchase total is greater than or equal to the threshold purchase total associated with a discount price tier (decision block 748). If the initial purchase total does qualify the transaction for discount pricing (i.e. the initial purchase total is greater than or equal to the threshold purchase total) the process proceeds to step 764, in which step the purchase total is recalculated using the discount price for the product. If the initial purchase total does not qualify the transaction for discount pricing, the process proceeds to step 750.

In step 750, the computer terminal 708 or the central server 702 calculates a difference between the initial purchase total for the transaction and a threshold purchase total required to qualify for discount pricing. The absolute value of this difference is the additional amount that the customer needs to spend in order to qualify for discount pricing. The additional amount that the customer needs to spend in order to qualify for discount pricing is then displayed on the monitor (not shown) of the computer terminal 708 (step 752) so that the customer service representative can advise the customer of the additional amount that the customer can spend in order to receive discount pricing (step 754).

At this point, it is determined whether the customer wishes to order another product (decision block 756). The customer may, for example, inform the customer service representative of another product he or she wishes to purchase or the customer service representative may suggest a product to the customer and the customer may agree to purchase the suggested product. For example, the central server 702 may determine an appropriate product to suggest to the customer based on, for example, (i) the initial purchase total, (ii) the product already included in the customer's order, (iii) the customer's previous purchases, or (iv) what products the operator of the order-taking facility 700 wishes to promote. If it is determined in decision block 756 that the customer does not wish to add another product to the transaction, the process proceeds to step 772, at which step the transaction processing is completed. The completion of transaction processing may comprise, for example, obtaining the payment information from a customer and the shipping address to which the current order should be shipped.

If it is determined in decision block 756 that another product is added to the current transaction, the customer service representative again enters a product identifier (step 758) into the computer terminal 708 and the computer terminal 708 or the server 702 recalculates the purchase total for the transaction based on the retail prices for the products now included in the customer's order (step 760). It is then determined, indecision block 762, whether the purchase total for the transaction is at least equal to the threshold purchase total required in order to qualify for discount pricing. If not, the process loops back to step 750.

If it is determined at decision block 762 that the discount pricing threshold purchase total has been satisfied, then the purchase total for the transaction is recalculated based on the discount prices for the ordered products (step 764). In addition, of course, the customer service representative may inform the customer that he or she has qualified for discount pricing.

Following step 764 is a decision block 766, at which it is determined whether the customer wishes to order another product. If so, the customer service representative enters another product identifier (step 768) into the computer terminal 708 and the purchase total for the transaction is recalculated based on the discount price for the newly added product (step 770). Of course, if more than one discount pricing tier is available, the purchase total may be calculated based on the retail prices for each product after the addition of another product, a determination made on which, if any, discount pricing tier the transaction qualifies for based on the purchase total, and the purchase total may be recalculated based on the appropriate discount pricing tier. The process then loops back to decision block 766.

If at decision block 766 it is determined that the customer does not wish to order another product, the process advances to step 770. At this step the customer service representative obtains payment information from the customer, such as a credit card number, and also is advised by the customer as to where the order should be shipped. Further computer processing for order fulfillment and tendering of the credit card payment to a collecting financial institution is also carried out.

The process just described in connection with FIG. 22 may be based on oral communication between the customer and a customer service representative. However, it is also contemplated to adapt the process of FIG. 26 for use in a catalog order-taking facility which employs an automatic voice response system. In this case, some or all of the customer service stations 706 would be eliminated and telephone calls from customers would be routed to a voice response system (not shown) interfaced to the central server 702. The voice response system responds to the telephone call and prompts the customer to enter product identifiers through the keypad of the customer's telephone. The voice response system confirms the ordered products and announces to the customer an additional amount or amounts for the customer to purchase to qualify for discount pricing. In the contemplation of the invention, an automatic voice response system is to be considered the equivalent of the customer service stations.

Many variations of the discounting techniques of the present invention have been described above, but all share common advantages. The retailer is able to provide the customers with incentives to make more and/or larger purchases, while setting discount prices for each product in a way that preserves satisfactory profit margins. The retailer also enjoys much greater flexibility in setting discount prices than has been available in conventional discounting plans.

Those skilled in the art will recognize that the method and apparatus of the present invention have many applications, and that the present invention is not limited to the representative examples disclosed herein. For example, rather than retrieving retail prices, threshold purchase totals, and discount prices from a database, such information may be stored directly on the products themselves, in the format of, for example, a bar code or microprocessors affixed to each product. Moreover, the scope of the present invention covers conventionally known variations and modifications to the system components described herein, as would be known by those skilled in the art.

What is claimed is:

1. A method of calculating a purchase total for a transaction, the method comprising the steps of:
   receiving a plurality of product identifiers, each of the product identifiers representing a respective product to be purchased;
   calculating an initial purchase total for the transaction based on respective first prices for each of the products to be purchased;
   determining whether the initial purchase total is at least equal to a predetermined threshold purchase total; and
   if the initial purchase total is at least equal to the predetermined threshold purchase total, calculating a reduced purchase total for the transaction based on respective second prices for each of the products to be purchased,
   at least one of the respective second prices being lower than the corresponding first price for the product to be purchased,
      wherein at least one of the respective second prices is calculated based on at least one of (i) the first price, (ii) a cost associated with the corresponding product, and (iii) a minimum profit amount, and
      wherein a percentage difference between one first price and the corresponding second price for a first product to be purchased in the transaction
      is different than
      a percentage difference between another first price and the corresponding second price of a second product to be purchased in the transaction.

2. A method according to claim 1, further comprising the step of retrieving the first and second prices from a database.

3. A method according to claim 2, wherein the retrieving step is completed before the step of calculating the initial purchase total.

4. A method according to claim 2, wherein a portion of the retrieving step is performed after the step of calculating the initial purchase total.

5. A method according to claim 1, further comprising the step of applying the reduced purchase total as a final purchase total for the transaction.

6. A method according to claim 1, further comprising the steps of:
   determining whether the reduced purchase total is less than the predetermined threshold purchase total; and
   if the reduced purchase total is less than the predetermined threshold purchase total, applying the initial purchase total as a final purchase total for the transaction.

7. A method according to claim 1, wherein the receiving step includes entering the product identifiers into a point of sale terminal.

8. A method according to claim 7, wherein the entering step includes using a bar code reader to read respective bar codes on the products to be purchased.

9. A method according to claim 1, wherein the receiving step includes receiving product identifiers entered by a customer via a Web site.

10. A method according to claim 1, wherein the receiving step includes entering product identifiers into a computer terminal in response to communication with a customer.

11. A method according to claim 1, further comprising the step of displaying the first and second prices in a retail store.

12. A method according to claim 1, further comprising the step of displaying in a retail store the first prices and respective discount amounts which define the second prices.

13. A method according to claim 1, further comprising the step of displaying in a retail store the first prices and respective discount percentages which define the second prices.

14. A method according to claim 1, further comprising the step of printing the first and second prices in a catalog.

15. A method according to claim 1, further comprising the step of displaying the first and second prices on a monitor component of a customer's computer in response to the customer accessing a Web site.

16. A method of calculating a purchase total for a transaction, the method comprising the steps of:
   receiving a plurality of product identifiers, each of the product identifiers representing a respective product to be purchased;
   calculating an initial purchase total for the transaction based on respective first prices for each of the products to be purchased;
   determining whether the initial purchase total is at least equal to a predetermined threshold purchase total; and
   if the initial purchase total is at least equal to the predetermined threshold purchase total, calculating a reduced purchase total for the transaction based on respective second prices for each of the products to be purchased, at least one of the respective second prices being lower than the corresponding first price for the product to be purchased,
      wherein a percentage difference between one first price and the corresponding second price for a first product to be purchased in the transaction
      is different than
      a percentage difference between another first price and the corresponding second price of a second product to be purchased in the transaction.

17. The method of claim 16, further comprising:
   retrieving the first and second prices from a database.

18. The method of claim 16, wherein the method is performed by a point-of-sale terminal.

19. The method of claim 18, wherein the method is performed by a point-of-sale terminal in a grocery store.

20. The method of claim 16, further comprising:
applying the reduced purchase total as a final purchase total for the transaction.

21. The method of claim 16, wherein the method is performed by a computer in response to a purchase by a remote customer of a web site.

22. The method of claim 21, further comprising:
causing the reduced purchase total to be displayed to the customer.

23. The method of claim 16, wherein the predetermined threshold purchase total comprises a minimum purchase total, and wherein
the step of determining whether the initial purchase total is at least equal to a predetermined threshold total further comprises determining whether the initial purchase total is less than a predetermined maximum purchase total,
thereby determining whether the initial purchase total is within a predetermined range of purchase totals.

24. The method of claim 16, wherein the predetermined threshold purchase total comprises at least one of (i) a purchase total of a single transaction, (ii) a purchase total of a plurality of transactions, and (iii) an average purchase total of a plurality of transactions.

25. The method of claim 16, wherein at least one of the plurality of product identifiers corresponds to at least two pricing tiers that are groups of prices, wherein the first price is associated with a first group of prices and the second price is associated with a second group of prices.

26. The method of claim 25, wherein the first group of prices is associated with a first predetermined threshold purchase total and the second group of prices is associated with a second predetermined threshold purchase total.

27. The method of claim 16, further comprising:
determining an amount that is a difference between the initial purchase total and the predetermined threshold total.

28. The method of claim 27, further comprising:
determining at least one of the respective second prices of at least one of the products to be purchased based on the difference.

29. The method of claim 16 wherein at least one of the respective second prices of at least one of the products to be purchased is determined based on purchasing history data associated with a customer that is associated with the transaction.

30. The method of claim 16 wherein the predetermined threshold purchase total is selected based on purchasing history data associated with a customer that is associated with the transaction.

31. The method of claim 16 wherein at least one of the predetermined threshold purchase total and the respective second prices is selected based on a customer identifier of a customer that is associated with the transaction.

* * * * *